(12) United States Patent
DeMarcken

(10) Patent No.: US 7,340,402 B1
(45) Date of Patent: Mar. 4, 2008

(54) GENERATING A DIVERSE SET OF TRAVEL OPTIONS

(75) Inventor: Carl G. DeMarcken, Cambridge, MA (US)

(73) Assignee: ITA Software, Inc., Cambridge, MA (US)

(*) Notice: Subject to any disclaimer, the term of this patent is extended or adjusted under 35 U.S.C. 154(b) by 515 days.

(21) Appl. No.: 09/431,365

(22) Filed: Nov. 1, 1999

(51) Int. Cl.
G06Q 10/00 (2006.01)
G06F 7/00 (2006.01)

(52) U.S. Cl. .................................. 705/5; 707/2; 707/3

(58) Field of Classification Search ............... 705/5, 705/6
See application file for complete search history.

(56) References Cited

U.S. PATENT DOCUMENTS

| | | | |
|---|---|---|---|
| 4,862,357 A * | 8/1989 | Ahlstrom et al. | 705/6 |
| 5,021,953 A | 6/1991 | Webber et al. | |
| 5,177,684 A | 1/1993 | Harker et al. | |
| 5,191,523 A * | 3/1993 | Whitesage | 364/407 |
| 5,237,499 A | 8/1993 | Garback | |
| 5,253,166 A | 10/1993 | Dettelbach et al. | |
| 5,255,184 A | 10/1993 | Hornick et al. | |
| 5,331,546 A * | 7/1994 | Webber et al. | 364/407 |
| 5,570,283 A | 10/1996 | Shoolery et al. | |
| 5,623,413 A | 4/1997 | Matheson et al. | |
| 5,644,721 A | 7/1997 | Chung et al. | |
| 5,732,398 A | 3/1998 | Tagawa | |
| 5,794,172 A | 8/1998 | Matheson et al. | |
| 5,797,127 A | 8/1998 | Walker et al. | |
| 5,832,451 A | 11/1998 | Flake et al. | |
| 5,832,453 A * | 11/1998 | O'Brien | 705/6 |
| 5,832,454 A | 11/1998 | Jafri et al. | |

(Continued)

FOREIGN PATENT DOCUMENTS

| | | |
|---|---|---|
| EP | 0 451 371 | 10/1991 |
| EP | 0 762 306 A2 | 3/1997 |
| WO | WO 89/07798 | 8/1989 |

OTHER PUBLICATIONS

Hillier, Frederick S.; Lieberman, Gerald S., Introduction to Operations Research, McGraw-Hill, Inc., 1995, 6th ed., pp. 494-495.*

"Towards desktop personal travel agents", D.T. Ndumu, J.C. Collis and H.S. Nwana, BT Technol. J., vol. 16, No. 3, Jul. 1998, pp. 69-78.

Primary Examiner—Jeffrey A. Smith
Assistant Examiner—Rachel L. Porter
(74) Attorney, Agent, or Firm—Fish & Richardson P.C.

(57) ABSTRACT

An airline travel planning system is described. The system includes a server computer executing a server process including a search process to search for set of pricing solutions in accordance with at least one destination and at least one origin. The search process represents the set of pricing solutions in the form of a directed acyclic graph. The system also includes a client computer executing a client process on the set of pricing solutions. The client process has a manipulation process that manipulates the set of pricing solutions in response to user preferences. Several processes are described including a process responsive to user preferences and to set of pricing solutions that provides pricing solutions sorted by said user preference, a process that sorts set of pricing solutions to produce a subset of said set of pricing solutions in accordance with user specified preferences, and a process that prunes from the directed acyclic graph nodes that are no longer contained within the subset of set of pricing solutions.

29 Claims, 16 Drawing Sheets

U.S. PATENT DOCUMENTS

| | | |
|---|---|---|
| 5,838,973 A | 11/1998 | Carpenter-Smith et al. |
| 5,897,620 A | 4/1999 | Walker et al. |
| 5,948,040 A | 9/1999 | DeLorme et al. |
| 6,119,094 A * | 9/2000 | Lynch et al. ............. 705/5 |
| 6,295,521 B1 * | 9/2001 | DeMarcken et al. ......... 705/6 |
| 6,360,205 B1 * | 3/2002 | Iyengar et al. ............. 705/5 |
| 6,442,537 B1 * | 8/2002 | Karch ..................... 706/50 |

* cited by examiner

1

GENERATING A DIVERSE SET OF TRAVEL OPTIONS

BACKGROUND

This invention relates to travel planning systems.

Computer travel planning systems such as airline computer reservation systems used by airline reservation agents, human travel agents, and automated travel agents such as internet web sites, generally produce a relatively small set of recommended travel options for a query that has a route and/or time specification.

For air travel, usually the number of travel options that a travel planning system produces is much smaller than the total set that could possibly satisfy a traveller's request. For example, a CRS may respond to a round-trip query specified by a departure city and date and a return city and date with a set of 10 or so possible flight and fare combinations, even though there may be thousands of combinations of flights that satisfy the request.

In many cases, resource limitations prevent a travel planning system from analyzing or generating more than a small set of travel options. Moreover, for air travel it may be that for each option the system needs to query airlines about seat availability. The availability process places practical limits the number of options that may be considered.

SUMMARY OF THE INVENTION

If a travel planning system is limited in the number of options it can generate, it may be desirable that the travel planning system consider or generate a diverse set of travel options. The planning system can maximize its chance of generating a good option by enforcing diversity in the set of options generated.

The diversity process in the air travel planning system generates answers on several different airlines, thus the system is capable of satisfying a greater ranger of travellers. Similarly, an air travel planning system that queries airlines about whether there are seats available on a limited number of flights may wish to choose flights at a diversity of flight times, in case flights at particular times of day are all full.

According to one aspect of the invention, travel planning system that outputs a set of travel options smaller than the complete set of travel options it has computed prunes the larger set of options to a smaller set with a diversity-based pruning process, where the larger set is represented by a compact representation.

One or more advantages are provided by the some of the aspects of the invention. The client process receives a set of pricing solutions provided in a compact representation. A preferred, compact representation of the set of pricing solutions is as a data structure comprising a plurality of nodes that can be logically manipulated using value functions to enumerate a set of pricing solutions. One preferred example is a graph data structure type particularly a directed acyclic graph that contains nodes that can be logically manipulated or combined to extract a plurality of pricing solutions. The client, can store and/or logically manipulate the set of pricing solutions to extract or display a subset of the set of pricing solutions without the need for additional intervention by the server.

BRIEF DESCRIPTION OF THE DRAWINGS

The foregoing features and other aspects of the invention will be described in further detail by the accompanying drawings, in which.

DETAILED DESCRIPTION

Figure 1:
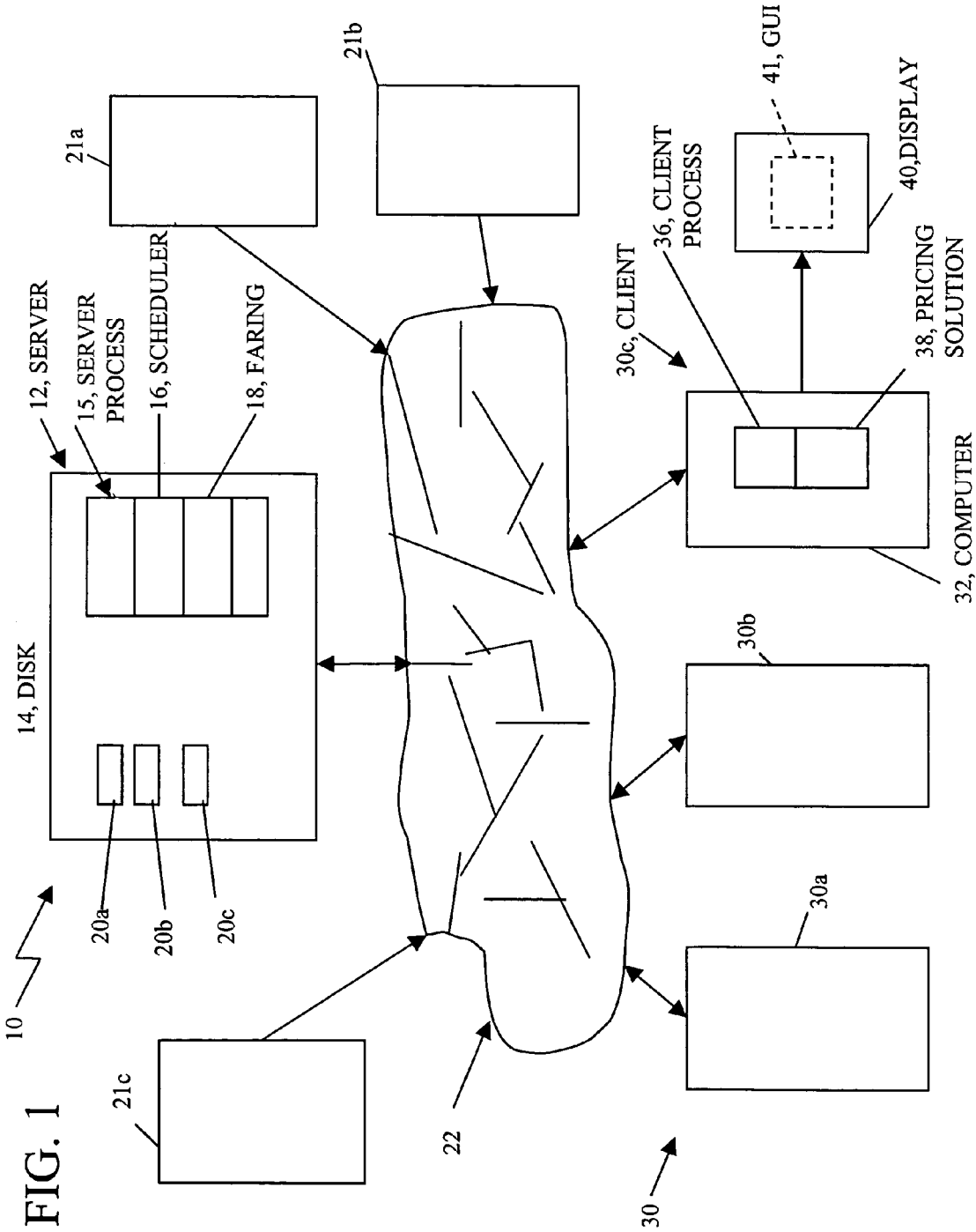
FIG. 1 is a block diagram of a client server travel planning system.

Referring now to FIG. 1, a travel planning system 10 is shown. The travel planning system can be used with various forms of travel such as airline, bus and railroad and is particularly adapted for air travel. It includes a server computer 12 having a computer memory or storage media 14 storing a server process 15. The server process includes a scheduler process 16 and a faring process 18. The scheduler process 16 is any suitable scheduler process that will produce from a travel request sets of flights that can satisfy the request. The faring process 18 is a process that determines a set of valid fares and links the set of valid fares to the sets of flights to form a pricing solution. The server process 15 can be configured to produce other travel-related information as a result of a user query. For example, the server process 12 can produce routes or airline suggestions, optimal travel times and suggestions for alternative requests.

The travel planning system 10 also includes a plurality of databases 20a, 20b which store industry-standard information pertaining to travel (e.g., airline, bus, railroad, etc.). For example, database 20a can store the Airline Tariff Publishing Company database of published airline fares and their associated rules, routings and other provisions, the so-called ATPCO database. Database 20b can be an inventory of current availability of airline information for a particular carrier and so forth. The databases 20a-20b are typically stored locally and updated periodically by accessing remote resources 21a, 21b that maintain the respective databases.

The system 10 also includes a plurality 30 of clients 30a-30c implemented by terminals or preferably personal computers. The clients 30a-30c are coupled to the server 12 via a network 22 which is also used to couple the remote resources (21a-21c) that supply the databases 20a-20b to the server 12. The network 22 can be any local or wide area network or an arrangement such as the Internet.

The clients 30a-30c are preferably smart clients. That is, using client 30c as an illustrative example, client 30c includes a client computer system 32 including a computer memory or storage media that stores a client process 36 and a set of pricing solutions 38. The set of pricing solutions 38 in one embodiment is provided from the server process 16 and comprises addition, it is shown being fed by the pricing solution when it may only receive flight information from the scheduler process 16 depending on the airline.

The set of pricing solutions 38 is obtained from the server 12 in response to a user request sent from the client 30c to the server 12. The server 12 executes the server process 15 using the scheduling process 16 and the faring process 18 to produce a set of pricing solutions for a particular journey. If requested by the client, for example client 30c, the server 12 will deliver the set of pricing solutions 38 to the requesting client 30c. Under control of the client process 36, the requesting client 30c can store and/or logically manipulate the set of pricing solutions 38 to extract or display a subset of the set of pricing solutions as a display representation 41 on the monitor 40.

Server Process

Figure 2:
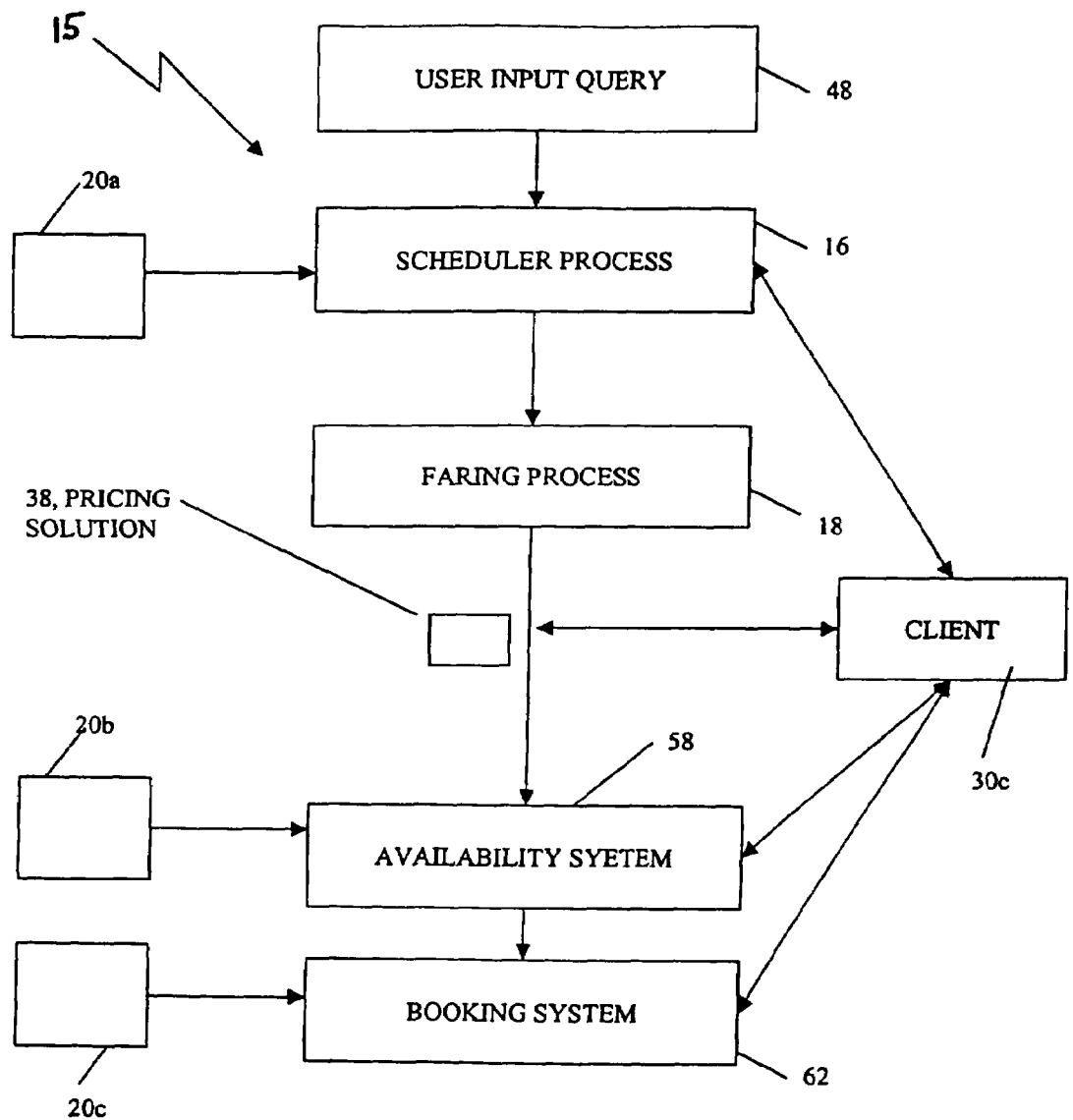
FIG. 2 is a flow chart showing a server process used in the system of FIG. 1.

Referring now to FIG. 2, the server process 18 is preferably executed on the server computer 12 but could be executed on the client computer 32. The server process 18 is responsive to a user input query 48. The user input query 48 would typically include minimal information needed to determine a set of pricing solutions. This information typically requires at a minimum, an origin and a destination for travel. In addition, the information could also include times, dates and so forth.

This query 48 is fed to the scheduler process 16 that produces a large number of itineraries, that is, sequences of flight segments between the origin and destination for each slice of a journey. Examples of scheduler systems that may be used include the OAG Flight Desk (Official Airlines Guide, a division of Reed Travel Group) or schedule components of computer reservation systems (CRS=s) such as Sabre7, Apollo7, Amadeus7 and WorldSpan7. It is preferable in order to obtain the largest number of possible itineraries to use a scheduler with dynamic connection generation. Such a scheduler is described in co-pending patent application entitled SCHEDULER SYSTEM FOR TRAVEL PLANNING SYSTEM, Ser. No. 09/109,622, filed on Jul. 2, 1998 by Carl G. deMarcken et al. and assigned to the assignee of the invention and incorporated herein by reference.

The scheduler process 16 provides the itineraries to a faring process 18. The faring process 18 provides a set of pricing solutions 38 by finding valid fares corresponding to the itineraries produced by the scheduler process 16. The faring process 18 validates the fares for inclusion in the set of pricing solutions 38. A preferred faring process that places fares and itineraries in a compact data structure referred to herein in as a pricing graph is described in co-pending patent application entitled TRAVEL PLANNING SYSTEM, Ser. No. 09/109,327, filed on Jul. 2, 1998 by Carl G. deMarcken et al. and assigned to the assignee of the invention and incorporated herein by reference.

The set of pricing solutions 38 is used by an availability system 58 that interrogates an airline inventory database 20b to determine whether there are seats available on particular flights for particular pricing solutions. The availability system 58 uses the airline inventory database 20b as a filter to remove from the set of pricing solutions 38 those pricing solutions for which there are not available seats. The availability system 58 is shown after the faring process 18. However, it could be included at nearly any point in the server process 18. In addition, it is shown being fed by the pricing solution when it may only receive flight information from the scheduler process 16 depending on the airline.

The client system 30c receives the results from the server process 15. These results are the set of pricing solutions 38 and/or pricing solutions based upon availability. The client process 36 executed in the client 30c uses this information or a subset of it to access a booking system 62 to provide a booking and reservation for a user selected, enumerated pricing solution, as will be described below.

Client Process

Figure 3:
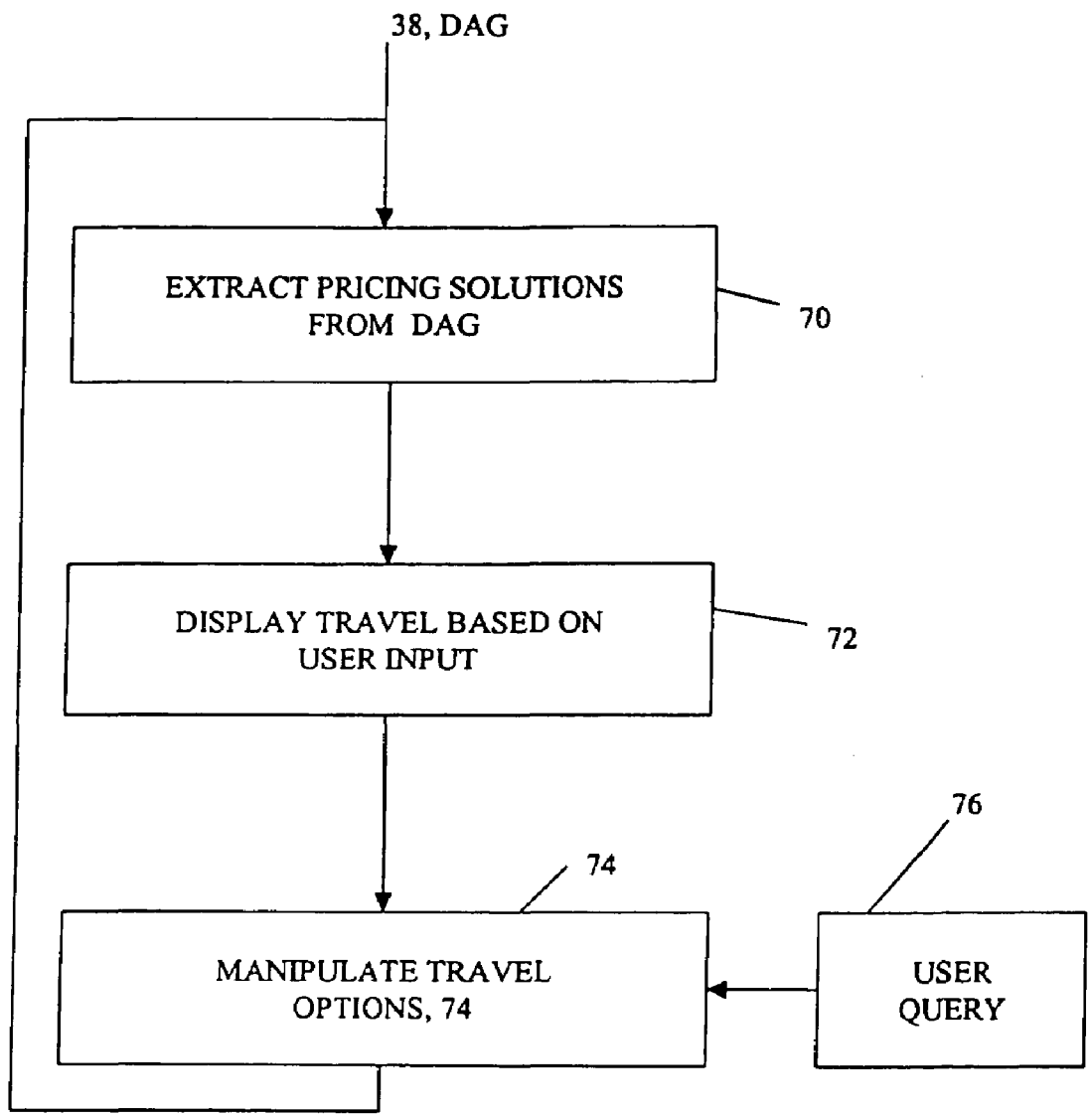
FIG. 3 is a flow chart showing a client process used in the system of FIG. 1.

Referring now to FIG. 3, the client process 36 receives a listing of possible itineraries from the scheduler process 16 as well as the set of fares from the faring process 18 or the availability system 58. The set of pricing solutions 38, if obtained from the faring process 18, will include a large number of pricing solutions for which there is not any available inventory. Therefore, the components would need to be first checked out with an airline prior to booking. The set of pricing solutions 38 if obtained after the availability system 58 should contain pricing solutions which have a high degree of availability for booking on an airline.

In one embodiment, the set of pricing solutions 38 is provided in a compact representation 38'. A preferred, compact representation 38' of the set of pricing solutions 38 is as a data structure comprising a plurality of nodes including itineraries and fares and that can be logically manipulated using value functions to enumerate a set of pricing solutions. One preferred example is a graph data structure type particularly a directed acyclic graph (DAG) that contains nodes that can be logically manipulated or combined to extract a plurality of pricing solutions.

The client process 36 receives the flight information from scheduler process 16 and the pricing solution from the faring process 18 or the availability system 58 and enumerates pricing solutions from the directed acyclic graph (DAG) representation. The enumerated set of pricing solutions is rendered in a graphical user interface 41 on the client monitor 40 (FIG. 1) in a manner as will be described below.

In response to user input 76, the client 30c can manipulate travel options and can query the local copy of the DAG to produce and display a subset of pricing solutions enumerated from the DAG that satisfy the query 76. The manipulation process used to control the display and change the travel options will be described below.

A directed acyclic graph (DAG) is used to represent the compact set of pricing solutions 38' since, in general, the number of nodes needed to represent a typical pricing solution will be substantially less than the actual number of pricing solutions represented by the DAG. This significantly increases the efficiency of transfer of a set of pricing solutions 38 from the server process 15 to the client process 36. The DAG representation also minimizes the storage requirements for the set of pricing solutions 38. The DAG representation permits the use of powerful search, sorting and manipulation processes to produce various subsets of set of pricing solutions in an efficient manner. As used herein, a directed acyclic graph (DAG) is a set of nodes connected by directed arcs, that have no loops of arcs in the same direction. If a node A is connected to a node B via an arc A6B, then A is called a parent of B, and B is called a child of A. Each node may have zero, one or many parents and zero, one or many children. As used herein, a pricing solution that is represented by a graph will be referred to as a pricing graph.

Pricing-Graph

A pricing graph that is produced by the faring process 18 and that represents a pricing solution includes three types of nodes. The first type of node is an exclusive node, i.e., "OR" node. An OR node N with children A, B and C represents an exclusive choice between A, B and C. In other words, a pricing-solution involving node N contains either the fares and itineraries represented by A, or by B, or by C.

The second type of node is a collection node, i.e., an "AND" node. An AND node N with children A, B and C represents the sum of A, B and C. In other words, a pricing solution involving N contains all the fares and itineraries found within A, B and C.

The third type of node is a terminal node. Terminal nodes are used to hold pricing objects. Pricing objects include fares, itineraries, surcharges, routes, prices, booking codes, taxes, rules/restrictions and other information of the user or information that might be part of a travel option. Collectively, "AND" and "OR" nodes are non-terminal nodes.

An example of the pricing-graph for a hypothetical round-trip journey is presented below in TABLE 1. For each node, its type and children are listed. If a node is a terminal, the fare or itinerary is provided. Many nodes in the pricing graph have more than one parent.

TABLE 1

| Node | Type | Children | Object |
|------|------|----------|--------|
| 0 | OR | Nodes 1, 2, 3 | |
| 1 | AND | Nodes 10, 14, 17, 17 | |
| 2 | AND | Nodes 4, 5 | |
| 3 | AND | Nodes 13, 15, 19, 19 | |
| 4 | OR | Nodes 8, 9 | |
| 5 | OR | Nodes 6, 7 | |
| 6 | AND | Nodes 14, 16 | |
| 7 | AND | Nodes 15, 18 | |
| 8 | AND | Nodes 13, 16 | |
| 9 | AND | Nodes 13, 18 | |
| 10 | OR | Nodes 11, 12 | |
| 11 | Itin. | | Slice 1: BOS6LAX UA023 |
| 12 | Itin. | | Slice 1: BOS6DFW UA100, DFW6LAX UA103 |
| 13 | Itin. | | Slice 1: BOS6SAN NW222 |
| 14 | Itin. | | Slice 2: LAX6BOS UA515 |
| 15 | Itin. | | Slice 2: SAN6BOS NW223 |
| 16 | Fare | | UA BOS-LAX One-way AY |
| 17 | Fare | | UA BOS-LAX Round-trip AQE7NR |
| 18 | Fare | | NW BOS-SAN One-way AF |
| 19 | Fare | | NW BOS-SAN Round-trip AH7NR |

This pricing-graph represents a total of nine pricing solutions. These solutions can be extracted from the pricing-graph by descending from the root node, node 0. At every OR node a choice between children is made, and the choice determines the pricing-solution that results. At every AND node each child branch is descended, and the results are combined.

The term BOS6LAX UA023 is an itinerary which uses standard nomenclature to represent airports BOS and LAX, airline UA, and flight number 023. In general, conventional nomenclature used in the airline industry will be used herein.

The set of pricing-solutions represented in the pricing-graph is presented in TABLE 2 below.

TABLE 2

| Solution Number | Itineraries | Fares |
|---|---|---|
| 1 | Slice 1: BOS6LAX UA023 | UA BOS-LAX RT AQE7NR |
| | Slice 2: LAX6BOS UA515 | UA BOS-LAX RT AQE7NR |
| 2 | Slice 1: BOS6LAX UA023 | UA BOS-LAX OW AY |
| | Slice 2: LAX6BOS UA515 | UA BOS-LAX OW AY |
| 3 | Slice 1: BOS6LAX UA023 | UA BOS-LAX OW AY |
| | Slice 2: SAN6BOS NW223 | NW BOS-SAN OW AF |
| 4 | Slice 1: BOS6DFW UA100, DFW_LAX UA103 | UA BOS-LAX RT AQE7NR |
| | Slice 2: LAX6BOS UA515 | UA BOS-LAX RT AQE7NR |
| 5 | Slice 1: BOS6DFW UA100, DFW_LAX UA103 | UA BOS-LAX OW AY |
| | Slice 2: LAX6BOS UA515 | UA BOS-LAX OW AY |
| 6 | Slice 1: BOS6DFW UA100, DFW_LAX UA103 | UA BOS-LAX OW AY |
| | Slice 2: SAN6BOS NW223 | NW BOS-SAN OW AF |
| 7 | Slice 1: BOS6SAN NW222 | NW BOS-SAN OW AF |
| | Slice 2: LAX6BOS UA515 | UA BOS-LAX OW AY |
| 8 | Slice 1: BOSESAN NW222 | NW BOS-SAN RT AH7NR |
| | Slice 2: SAN6BOS NW223 | NW BOS-SAN RT AH7NR |
| 9 | Slice 1: BOS6SAN NW222 | NW BOS-SAN OW AF |
| | Slice 2: SAN6BOS NW223 | NW BOS-SAN OW AF |

The pricing-graph encodes the requirement that two itineraries are combined, one from slice 1 and one from slice 2, to form a pricing solution. Further, each itinerary is spanned by fares. In this case each pricing solution involves two fares, and round-trip fares are combined with like round-trip fares. In most circumstances, the number of nodes in the pricing-graph is small compared to the number of pricing-solutions those nodes represent. In many cases, a graph of 10,000 or so nodes can represent more than 1,000,000,000 pricing-solutions.

Figure 3A:
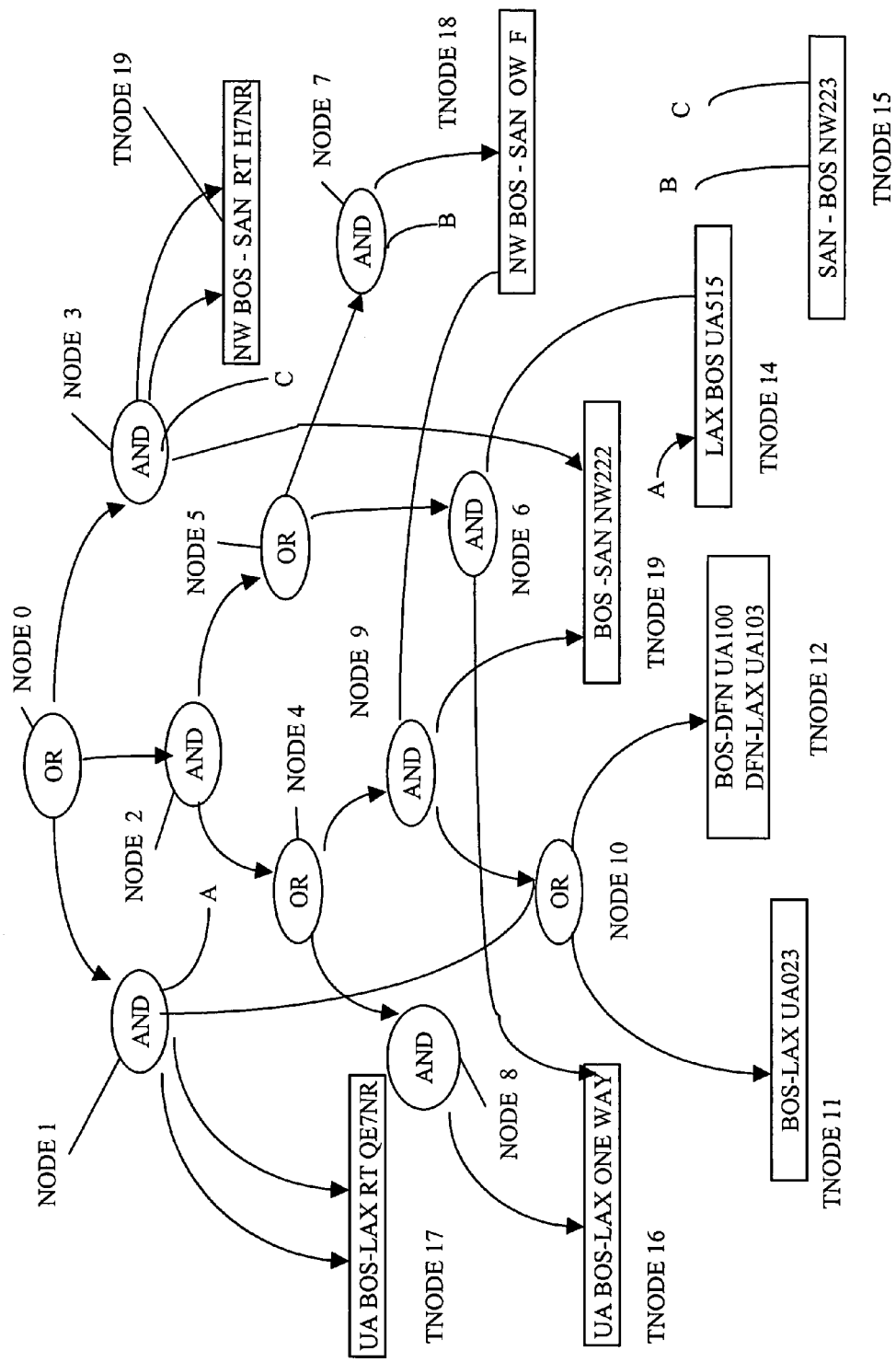
FIGS. 3A-3B are diagrammatic representations of pricing graphs.

Referring now to FIG. 3A, the nodes of the pricing graph corresponding to Table 1 are shown, as an example. This figure illustrates the manner in which nodes in the pricing graph data structure as represented in Table 1 are combined to provide the pricing solutions shown in Table 2. Using pricing solution No. 1 (from TABLE 2) as an example, it can be shown that starting at the top of the graph at node 0, node 0 allows for a choice between nodes 1, 2, and 3. For pricing solution No. 1, Node 1 is chosen. Node 1 is the AND node that points to nodes 10 and 14, and has two pointers to node 17. Node 10 is an OR node which provides a choice of either nodes 11 or nodes 12. Node 11 as shown in FIG. 3A corresponds to a terminal node, the itinerary (>BOS-LAX UA 023). Node 12 corresponds to a terminal node, the itinerary BOS-DFN UA 100, DFN-LAX UA 103. This second choice in node 10 will provide pricing solutions corresponding to numbers 4-6, respectively. Therefore, selecting node 11 provides the itinerary for the first slice of solution 1. The fare for pricing solution 1 is provided by node 17 which has two pointers, one for each slice, to the fare "US BOS-LAX RT QE7NR" corresponding to the fare shown for pricing solution no. 1 in Table 2 for the first slice. The second itinerary for pricing solution no. 1 is provided by node 14 which is referenced in AND node 1 that points to the itinerary LAX-BOS UA 515. The corresponding fare is also from terminal node 17 since it is a round trip fare UA BOS-LAX RT QE7NR.

A second one of the pricing solutions, for example, the pricing solution 4 incorporating the terminal node 12 is provided by starting at node 0, and using node 1. Node 1 is an AND node requiring that nodes 17 (twice), node 10, and node 14 be included. Node 10 is an OR node as mentioned above and is used to select node 12 which is the itinerary including segments ABOS6DFW UA 100" and ADFW6LAX UA 103". From node 1, node 14 the return itinerary LAX-BOS UA 515 also is reached. Node 17 also is chosen which contain the round trip fares. Similarly, the remaining ones of the pricing solutions can be extracted from the pricing graph in the same manner as the two examples given above.

As mentioned above, a graph will typically have many more pricing solutions than nodes in the graph. The example just illustrated in conjunction with FIG. 3A has 9 pricing solutions and 19 nodes which is an exception to that general rule. Another example of a pricing graph which does satisfy that general observation is shown in conjunction with FIG. 3B.

Figure 3B:
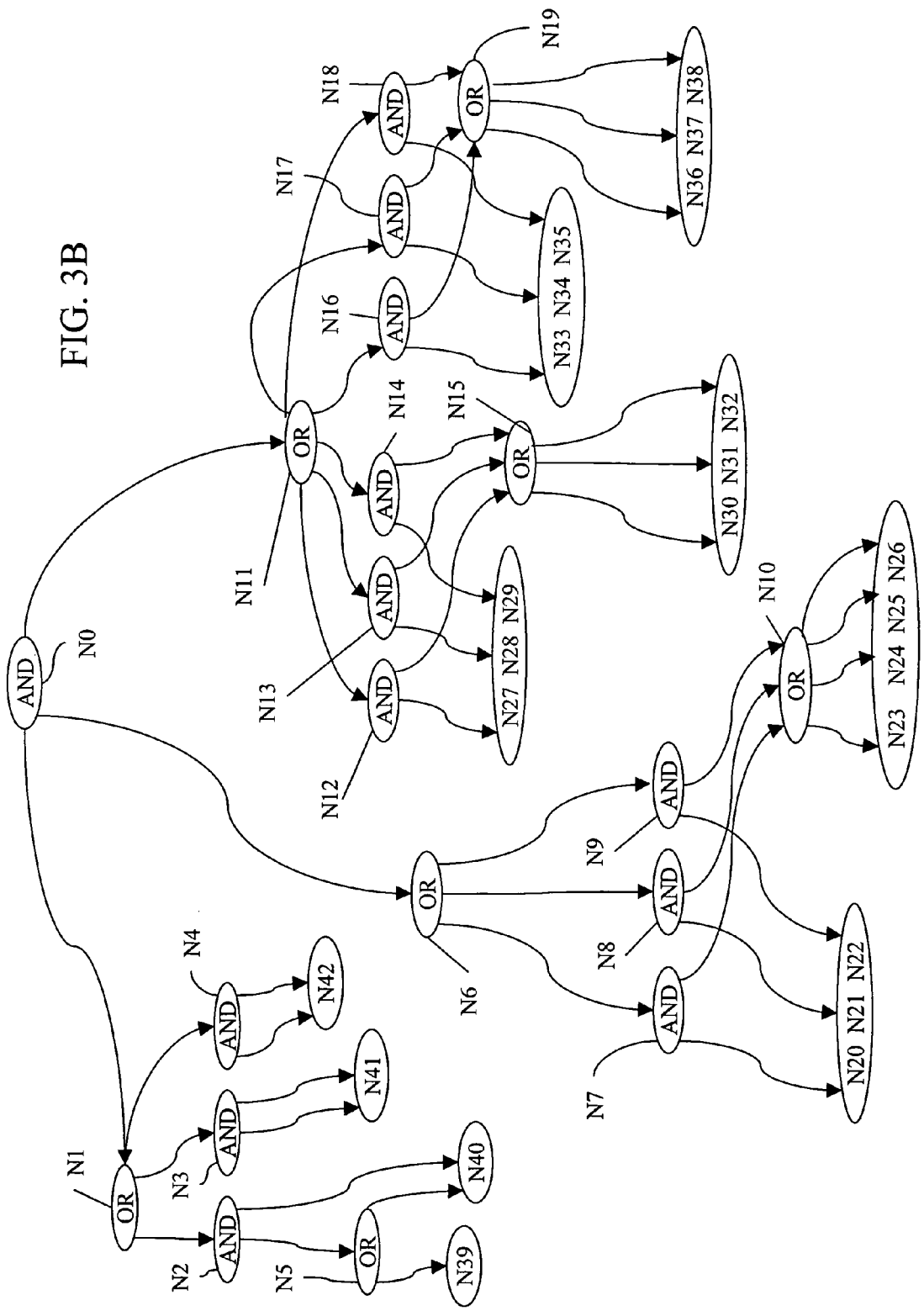

Referring now to FIG. 3B, a pricing graph is shown having 43 nodes N0-N42 that when combined represent 856 pricing solutions. Each node in the pricing graph has a number associated with it corresponding to the number of pricing solutions that is represents. In order to make this illustration of manageable size, identifiers (representing the nodes of the terminals) are substituted in the pricing graph for the actual terminal objects of the graph. Thus, as shown in FIG. 3B, outbound and return itineraries, and fare nodes are represented by the Nodes N20-N42.

This pricing graph (TABLE 3) has 9 itineraries which can be combined with 14 fares represented by 13 AND nodes and 7 OR nodes. The pricing objects are represented by 23 nodes. The pricing graph has a combined total of 43 nodes to represent 876 pricing solutions.

FIG. 3B shows examples of a pricing graph for a round trip LAX-BOS journey. This example shown in FIG. 3B is generally more representative of an outcome of a faring search. That is, generally the pricing graph represents more pricing solutions than nodes contained in the graph.

TABLE 3

| Node | Type | Children | Object |
|------|------|----------|--------|
| 0 | AND | Nodes 1, 6, 11 | |
| 1 | OR | Nodes 2, 3, 4 | |
| 2 | AND | Nodes 5, 40 | |
| 3 | AND | Nodes 41, 41 | |
| 4 | AND | Nodes 42, 42 | |
| 5 | OR | Nodes 39, 40 | |
| 6 | OR | Nodes 7, 8, 9 | |
| 7 | AND | Nodes 20, 10 | |
| 8 | AND | Nodes 21, 10 | |
| 9 | AND | Nodes 22, 10 | |
| 10 | OR | Nodes 23, 24, 25, 26 | |
| 11 | OR | Nodes 12, 13, 14, 16, 17, 18 | |
| 12 | AND | Nodes 27, 15 | |
| 13 | AND | Nodes 28, 15 | |
| 14 | AND | Nodes 29, 15 | |
| 15 | AND | Nodes 30, 31, 32 | |
| 16 | AND | Nodes 33, 19 | |
| 17 | AND | Nodes 34, 19 | |
| 18 | AND | Nodes 35, 19 | |
| 19 | OR | Nodes 36, 37, 38 | |
| 20 | Itin. | | Slice 1: LAX6DFW NW100, DFW6BOS AA223 |
| 21 | Itin. | | Slice 1: LAX6DFW NW137, DFW6BOS AA223 |
| 22 | Itin. | | Slice 1: LAX6DFW NW137, DFW6BOS AA414 |
| 23 | Fare | | DFW, LAX NW AY OW |
| 24 | Fare | | DFW, LAX NW AF OW |
| 25 | Fare | | DFW, LAX NW AC OW |
| 26 | Fare | | DFW, LAX NW AQA7" OW |
| 27 | Itin. | | Slice 2: BOS6DFW AA67, DFW6LAX CO716 |

TABLE 3-continued

| Node | Type | Children | Object |
|------|------|----------|--------|
| 28 | Itin. | | Slice 2: BOS6DFW AA67, DFW6LAX CO717 |
| 29 | Itin. | | Slice 2: BOS6DFW AA67, DFW6LAX CO719 |
| 30 | Fare | | DFW, LAX CO AF OW |
| 31 | Fare | | DFW, LAX CO AC OW |
| 32 | Fare | | DFW, LAX CO AY OW |
| 33 | Itin. | | Slice 2: BOS6DFW AA852, DFW6LAX DL186 |
| 34 | Itin. | | Slice 2: BOS6DFW AA852, DFW6LAX DL180 |
| 35 | Itin. | | Slice 2: BOS6DFW AA852, DFW6LAX DL343 |
| 36 | Fare | | DFW, LAX DL AF OW |
| 37 | Fare | | DFW, LAX DL AC OW |
| 38 | Fare | | DFW, LAX DL AY OW |
| 39 | Fare | | DFW, BOS AA AQE7NR RT |
| 40 | Fare | | DFW, BOS AA AQE7IP RT |
| 41 | Fare | | DFW, BOS AA AQE14NR RT |
| 42 | Fare | | DFW, BOS AA AQE21NR RT |

The Faring System

Figure 4A:
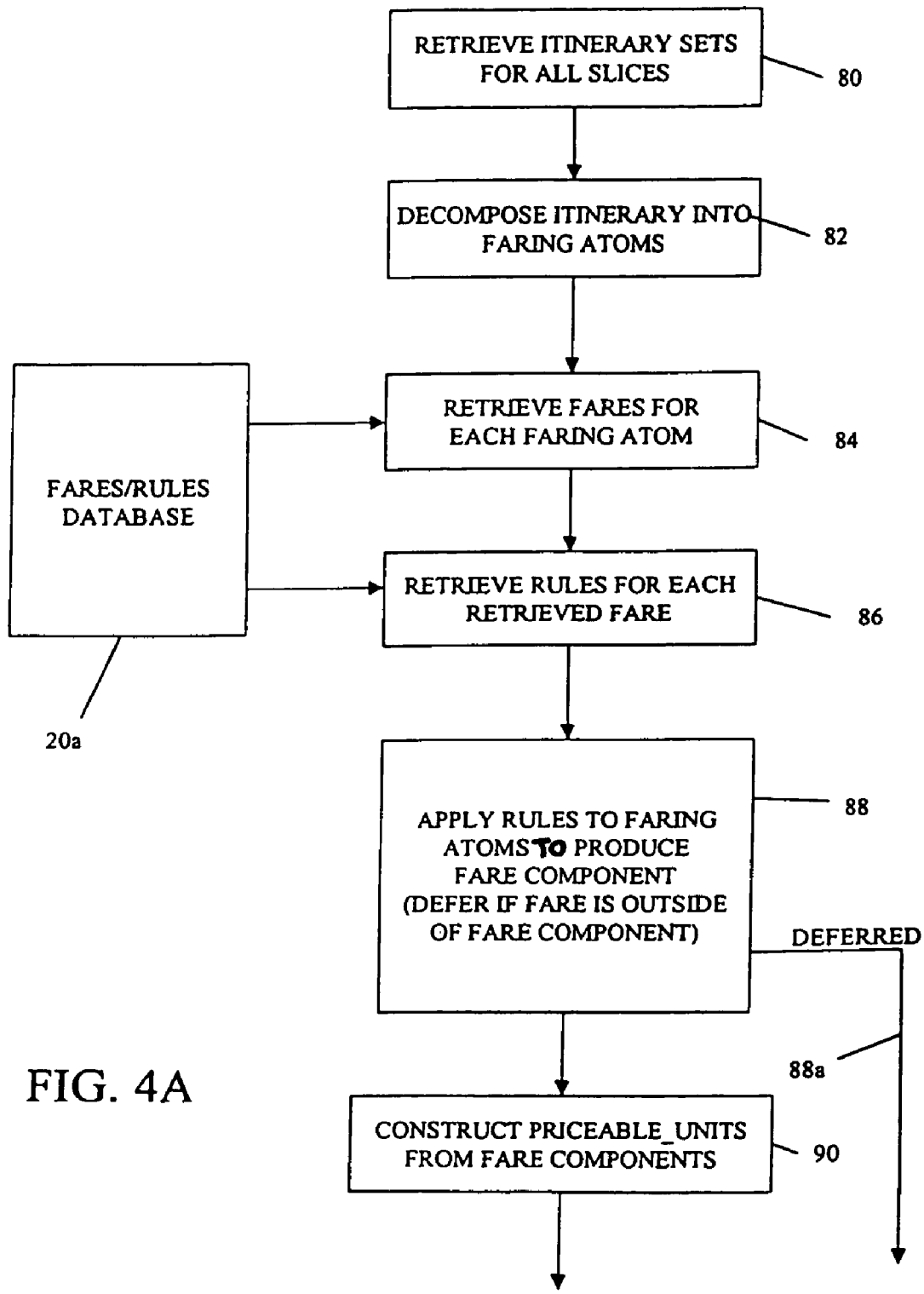
FIGS. 4A-4B are flow charts showing a faring process used in the server process of FIG. 2.
Figure 4B:
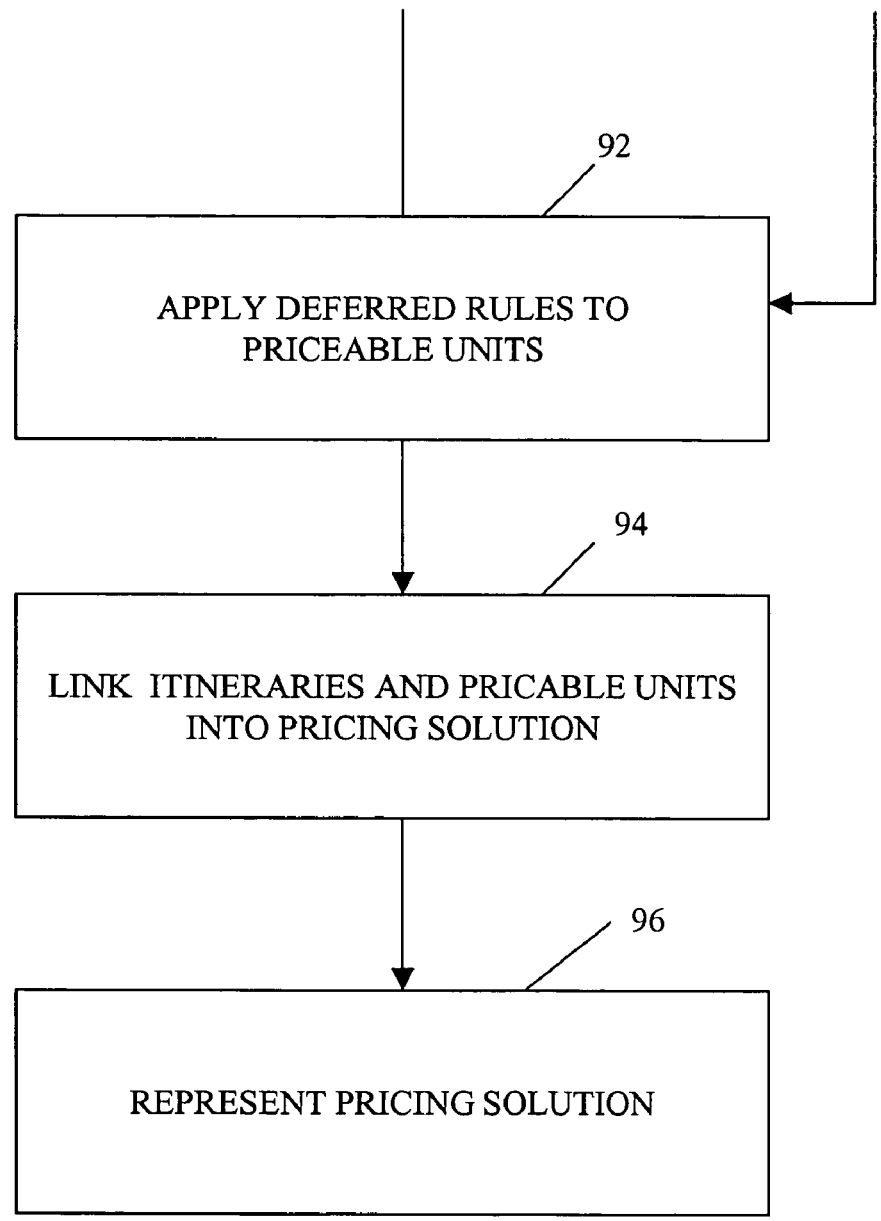

Referring now to FIGS. 4A and 4B, the faring process 18 includes a process 80 to retrieve itinerary sets for all slices in an itinerary. The itinerary sets are provided from the scheduler process 16 for each slice of a journey where a slice corresponds to a direction of travel. Thus, for example, for a round trip journey there would be two slices, one for the outbound part of the journey and one for the return part of the journey. The faring process 18 decomposes 82 the itinerary into faring atoms. As used herein, faring atoms refer to a sequence of flight segments or equivalently legs that are spanned by a single fare. For example, the itinerary UA005 from DFW to BOS at 12:30 on 12NOV
UA010 from BOS to YYZ at 18:00 on 12NOV
AC121 from YYZ to YVR at 01:00 on 13NOV permits the following faring-atoms as shown in TABLE 4.

TABLE 4

| Faring-Atom Number | Legs and Departure Times |
|--------------------|--------------------------|
| 1 | DFW6BOS UA005 12NOV 12:30 |
| 2 | BOS6YYZ UA010 12NOV 18:00 |
| 3 | DFW6BOS UA005 12NOV 12:30 |
|   | BOS6YYZ UA010 12NOV 18:00 |
| 4 | YYZ6YVR AC121 13NOV 01:00 |

A faring atom is represented by a data structure that preferably includes the following fields as shown in TABLE 5:

TABLE 5

| Faring-Atom fields | Use |
|--------------------|-----|
| legs-and-departure-times | A list of legs and their departure times and dates. |
| faring-market | The faring-market that this faring-atom is in. |
| cached-results | A storage space used to eliminate redundant computation in the rule-checking process. As rule record-2s are applied to faring-atoms, the results are stored in this field. If the same record-2 is applied again, the answer is retrieved rather than recomputed. |
| priceable-unit-labels | A list of the priceable-unit-labels that the faring-atom enters into. |

After the faring process 18 decomposes the itineraries into faring atoms, the faring process 18 retrieves fares 84 and rules 86 for each faring atom by accessing the fares/rules database 20*a* mentioned above. At this point a fare's routing is retrieved from a routing database and applied to a faring atom. If the routing test fails, the fare cannot be applied to the faring atom and a fare component is not built.

The faring process 18 applies the rules 88 to the faring atoms to produce fare components. Fare-components are combinations of faring-atoms and fares. Fare-components (TABLE 6) are produced if a fare's rules pass a preliminary check on a faring-atom. They are used to store deferred rules (e.g., deferred record-2s and combinability record-2s) that are applied at a later stage of processing. Fare components also store extra information produced during the rule-checking process, such as information about surcharges and penalties and discounts that are applied to the base fare price.

TABLE 6

| | |
|---|---|
| fare | The fare-component's fare. |
| faring-atom | The fare-component's faring-atom. |
| deferred-record-2s | A list of non-category-10 record-2s that have not been fully evaluated. |
| combinability-record-2 | If the fare's rules include a category-10 (AFare Combinability record-2, it is stored here. |
| surcharges | A list of surcharges, penalties, discounts and other pieces of information produced during the rule-checking process. |

From the fare components the faring process 18 constructs 90 priceable units. For certain types of rules such as those which require access to fares and/or flights from outside of the fare component, those rules are stored 88*a* in the fare component for later or deferred are evaluation. The priceable unit process 90, takes valid fare components and constructs priceable units from the fare components. This process 90 involves grouping fare components from different slices and checking fare component combination restrictions. At this stage of processing, the rules deferred in steps 88 and 88*a* are reapplied.

Priceable units are represented by priceable-unit-cores and priceable-unit-labels. Priceable-unit-cores are collections of fares and other information associated with fares within a priceable-unit, such as discounts and penalties and surcharges. Priceable-unit-cores (TABLE 7) are referenced by priceable-unit-labels.

TABLE 7

| Priceable-Unit-Core fields | Use |
|---|---|
| fares | A list of fares. |
| slice-numbers | A list of the slices the fares originate from. |
| surcharges | A list of surcharges, penalties, discounts and other pieces of information produced during the rule-checking process. |

Priceable-unit-labels group a set of priceable-unit-cores with sets of faring-atoms. Together, they are used to represent sets of priceable-units (TABLE 8).

TABLE 8

| Priceable-Unit-Label fields | Use |
|---|---|
| priceable-unit-cores | A set of priceable-unit cores. |
| slice-numbers | A list of the slices the fares and faring-atoms originate from. |
| faring-atom-sets | A list of sets of faring-atoms, one per slice. |

When all the fare components within a priceable unit are known, rules that were deferred from the processing 88 are applied 92 to the priceable unit sets of faring atoms.

After evaluation of the deferred record-2s at the priceable unit stage, the itineraries and priceable units are grouped together into a complete set of pricing solutions. This occurs by a link process 94 that links itineraries to corresponding pricing units from different slices to provide the pricing solution. At this juncture, any remaining cross-priceable unit fare combinability checks are performed to eliminate invalid combinations.

The linking process involves two additional data structures slice-label-sets and open-label-sets. Slice-label-sets group itinerary divisions by the multi-slice priceable-unit-labels they can enter into. In each slice of a journey, a unique slice-label-set is constructed for every set of multi-slice priceable-unit-labels. Each slice-label-set stores both the set of multi-slice priceable-unit-labels and a set of itinerary-label-holders, which contain single-slice priceable-unit-labels on a per-itinerary basis. Each slice-label-set is a pair of an itinerary and a set of division-label-holders. Each of these division-label-holders is a pair of a division and a set of sets of single-slice priceable-unit-labels (TABLE 9).

TABLE 9

| | Use |
|---|---|
| Slice-Label-Set fields | |
| multi-slice-PU-labels | A set of multi-slice PU-labels. |
| itinerary-label-holders | A set of itinerary-label-holders. |
| Itinerary-Label-Holder fields | |
| itinerary | An itinerary. |
| division-label-holders | A set of division-label-holders. |
| Division-Label-Holder fields | |
| division | An itinerary division. |
| single-slice-PU-label-sets | A set of sets of single-slice PU-labels. |

Open-label-sets (TABLE 10) are used to summarize the state of the linking process 94. Each is a set of "open" multi-slice priceable-unit-labels and a set of backward-links. Each of these backward-links is a pair of a slice-label-set and an open-label-set.

TABLE 10

| | Use |
|---|---|
| Open-Label-Set fields | |
| open-PU-labels | A set of open multi-slice PU-labels. |
| backward-links | A set of backward-links. |
| Backward-Link fields | |
| slice-label-set | A slice-label-set. |
| open-label-set | An open-label-set. |

The pricing solution resulting from the linking process 94 is used to construct 96 a pricing graph from the various data structures built during the preceding processes. This pricing graph is transmitted to the client process or can be stored for later use or transmission. A pseudocode representation of the high level processing logic involved in the above search procedure is set out below in TABLE 11.

nodes in the pricing graph will be shared so that the size of the pricing graph is not unnecessarily enlarged. The converted nodes are placed in the pricing graph nodes. Terminal objects such as fares and itineraries undergo essentially no conversion. They are placed into special terminal nodes with no children and are obtained from the various data structures that have the pricing objects.

TABLE 11

```
price-itinerary-sets(itinerary-sets, fare-database, rule-database, routing-
database, environmental-information)
    //
    // itinerary-sets is a set of sets of itineraries, one per slice.
    // environmental-information contains information about the passenger, the current date, the location
    // where tickets will be purchased, and other non-itinerary-based information that is necessary for applying
    // fare rules.
    //
    Let faring-market-sets = 0
    // Construct itinerary-divisions, faring-markets and faring-atoms.
    Let slice-number = 1
    For itinerary-set in itinerary-sets
        //
        // create-divisions constructs the itinerary-divisions, faring-markets and faring-atoms for
        // all the itineraries within a slice. It returns a set of faring-markets.
        faring-market-sets += create-divisions(itineraries, slice-number, fare-database)
        slice-number += 1
    // Apply fare rules, constructing fare-components in each faring-market.
    For faring-market-set in faring-market-sets
        //
        // apply-fare-rules constructs fare-components for each faring-market within a slice.
        // This process contains pseudo-code for apply-fare-rules.
        apply-fare-rules(faring-market-set, fare-database, rule-database,
                routing-database, environmental-information)
    // Create priceable-units.
    // for create-priceable-units
    create-priceable-units(faring-market-sets)
    // Link itineraries between slices. This procedure returns either nil, if there are no pricing-solutions, or
    // a Aroot open-label-set. This process is described in link-itineraries
    Let root-object = link-itineraries(itinerary-sets)
    If (root-object = nil)
        return(nil)
    // Create the pricing-graph from the data-structures that have been built in the preceding steps.
    // This process includes psedo-code for create-pricing-graph.
    Let rcot-node = create-pricing-graph(rcot-object)
    // Return the pricing graph.
    return(root-node)
```

Pricing Graph

Figure 5:
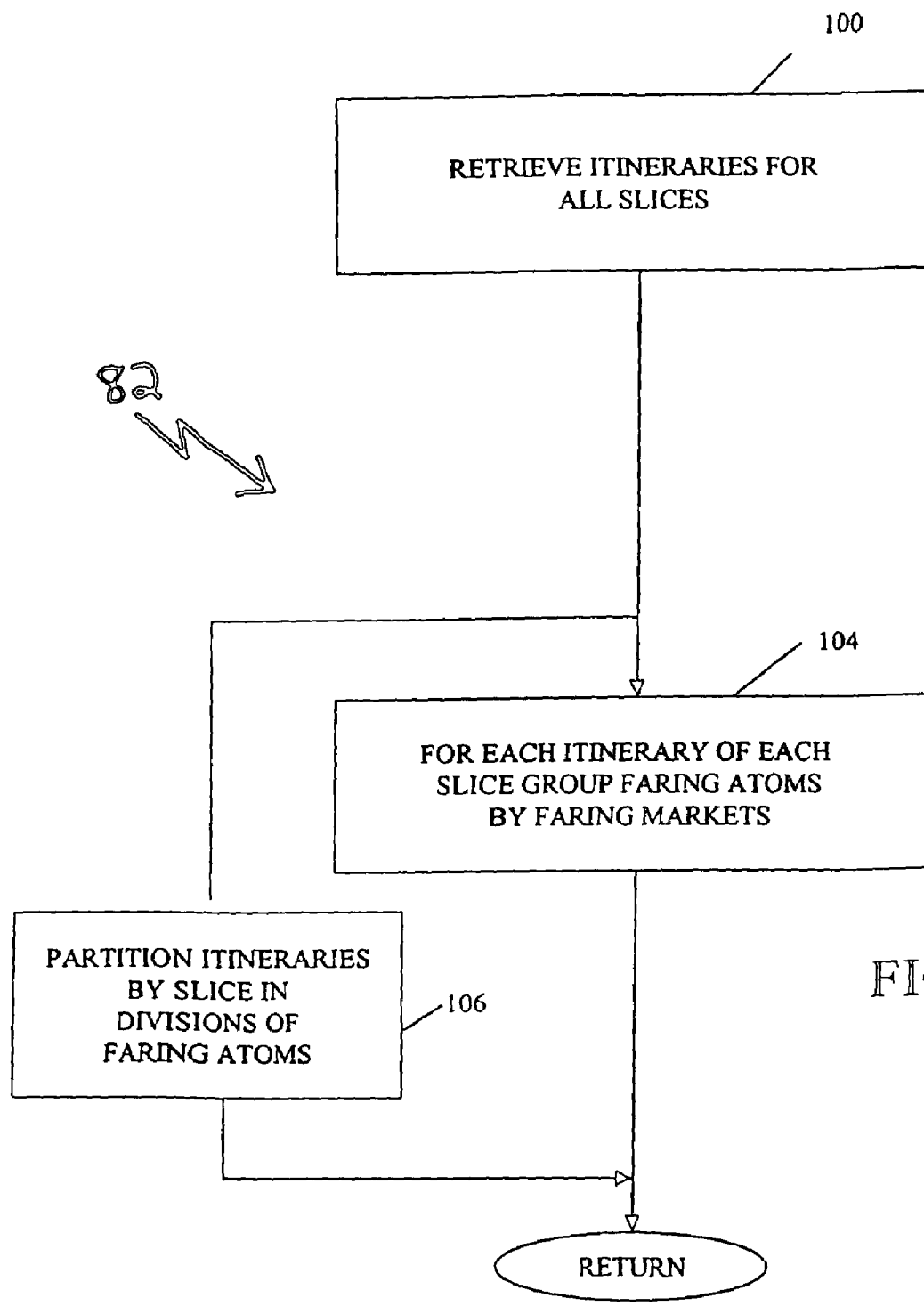
FIG. 5 is a flow chart showing the process for constructing a pricing graph.

Referring now to FIG. 5, the process 82 to decompose an itinerary into faring atoms includes a retrieval process 100 that retrieves all itineraries for all slices in a journey. For each itinerary in each slice, the process 82 groups fairing atoms by faring markets at 104 and partitions itineraries into the divisions of faring atoms at 106.

A pricing graph 38' (FIG. 3) is produced containing logically combinable nodes that can be used to efficiently and compactly represent a set of pricing solutions 38 (FIG. 1). The pricing graph 38' as used herein is a so-called directed acyclic graph although other types of representations could be used. For example, a grammar could be used.

The pricing graph 38' is constructed from data structures (summarized below in TABLE 12 and mentioned in conjunction with FIGS. 4A-4B) provided during the preceding processes. The data structures convert to one or more nodes in the pricing graph. The open-label-set data structure becomes an OR node and its children are the converted versions of its backward links. Each backward link in the open label set is converted to an AND node. If a pricing object is shared, for example, a priceable unit core is shared between several priceable unit labels, then its counterpart

TABLE 12

| Data-Structure Type | Type | Child Fields |
|---|---|---|
| open-label-set | OR | backward-links (each a backward-link). |
| backward-link | AND | open-label-set (an open-label-set). |
| | | slice-label-set (a slice-label-set). |
| slice-label-set | AND (OR) | multi-slice-PU-labels (each a priceable-unit-label). |
| | | itinerary-label-holders (each an itinerary-label-holder). |
| | | The itinerary-label-holders are put into an OR and the OR is placed under the AND, which also includes all multi-slice-PU-labels. |
| itinerary-label-holder | AND (OR) | itinerary (an itinerary). |
| | | division-label-holders (each a division-label-holder). The division-label-holders are put into an OR and the OR is placed in an AND with the itinerary. |

TABLE 12-continued

| Data-Structure Type | Type | Child Fields |
|---|---|---|
| division-label-holder | OR (AND) | single-slice-PU-label-sets (each a set of sets of PU-labels). The inner sets are put into ANDs, and these are all embedded under an OR. |
| priceable-unit-label | OR | priceable-unit-cores (each a priceable-unit-core). |
| priceable-unit-core | AND | fares (each a fare). surcharges (each a surcharge, penalty, discount, etc.) |
| fares | Term | |
| itinerary | Term | |
| surcharge | Term | |

In cases where a node has only one child, there is no need to produce the node. Rather, a direct link can be passed to its child. This does not alter the interpretation of the pricing-graph, but can result in a smaller graph.

The pseudo-code below TABLE 13 summarizes construction of the pricing graph, given the "root" open-label-set that is the output of the linking process.

TABLE 13

```
create-pricing-graph(root-object)
    Let nodes =

Subroutine convert-object(object)
        // Convert the object and cache the result, so that nodes with multiple parents are shared
        Let node = find(object, nodes)
        If (node = nil)
            node = convert(object)
            nodes += node
        return(node)
    Subroutine convert-objects (objects)
        // Convert the set of objects and return a set of nodes.
        Let result =

For object in objects
            result += convert-object(object)
        return(result)
    Subroutine create-node(children, type)
        // Create a node of type type with children children, if there is more than one child.
        // Otherwise the node is unnecessary, and the only child is returned.
        If (length(children) = 1)
            return(first(child)
        Else
            Let node = new-node( )
            node.type = type
            node.children = children
            node.terminal-object = nil
            return(node)
    Subroutine convert(object)
        Let object-type = type(object)
        If (type = open-label-set)
            return(create-node(convert-objects(object.backward-links), OR))
        Else If (type = backward-link)
            return(create-node(list(convert-object(object.slice-label-set), convert-object(object.open-label-set)), AND)
        Else If (type = slice-label-set)
            Let children = convert-objects(object.multi-slice-PU-labels)
            children += create-node(convert-objects(object.itinerary-label-holders), OR)
            return(create-node(children, AND))
        Else If (type = itinerary-label-holder)
            Let children = convert-objects(object.division-label-holders)
            children += create-node(convert-objects(object.itinerary), OR)
            return(create-node(children, AND))
        Else If (type = division-label-holder)
            Let children =

For single-slice-PU-label-set in object.single-slice-PU-label-sets
                children += create-node(convert-objects(single-slice-PU-label-set), AND)
            return(create-node(children, OR))
        Else If (type = priceable-unit-label)
            return(create-node(convert-objects(object.priceable-unit-cores), OR)
        Else If (type = priceable-unit-core)
            return(create-node(append(convert-objects(object.fares), convert-objects(object.surcharges)), AND)
```

TABLE 13-continued

```
    Else // object is a terminal.
        Let node = new-node( )
        node.type = terminal
        node.children = 0
        node.terminal-object = object
        return(node)
return(connvert-object(root-object))
```

The pricing graph 38' resulting from the search procedure provides a compact way for representing a very large number of set of pricing solutions. By the above process, it is often possible to obtain a very large number of pricing solution components. Although the number of pricing solutions can be returned in-the form of a simple list, this is not desirable, as a very large number of pricing solutions can be difficult to manipulate, enumerate and interrogate and to transfer/transmit across a network since the amount of data involved is very large. The pricing graph 38' provides a more compact way of representing these pricing solutions. The compact representation of the range of set of pricing solutions is generated where choices are represented explicitly and redundancy is removed wherever possible.

As mentioned above, the pricing graph 38' produced by the search procedure includes three types of nodes. The first type of node is a node that represents choices called "LOGICAL OR" nodes. The second type of node is a node that represents collections referred to as "LOGICAL AND" nodes. A third type of node represented in the pricing graph is a terminal node that represents pricing objects.

A data structure representation (TABLE 14) of the nodes is set out below. Each node contains a "type", which specifies whether the node is an AND node, an OR node or a terminal node. The data structure also contains either list of children (if the node is an AND node or an OR node) or a terminal object (if the node is a terminal). The node contains fields that store values used by algorithms that manipulate the pricing graph 38'.

TABLE 14

| | |
|---|---|
| type | Either AND, OR or TERMiNAL |
| children | A list of child-nodes, if node is AND or OR. |
| terminal-object | A terminal-object such as a fare or itinerary, if the node is TERMINAL. |
| active? | True or false, depending on whether the node is active. |
| inner-value | The node's minimum possible inner-value. |
| outer-value | The node's minimum possible outer-value. |
| total-value | The node's minimum possible total-value. |
| best-child | For OR-nodes, the child with the least-positive inner-value. |

As mentioned above, the pricing graph 38' is a compact representation of a set of set of pricing solutions. The typical number of set of pricing solutions represented by pricing graph ranges from tens of millions into hundreds of billions with the number of nodes in the graph ranging from thousands to tens of thousands. The pricing graph can be easily stored and/or transmitted over a network or other connection to a client and represents complete representation of all or substantially all of possible pricing solutions. Therefore, the pricing graph 38' can be used by a smart client without further intervention from the server 12.

Manipulating the Pricing-Graph

Figure 6:
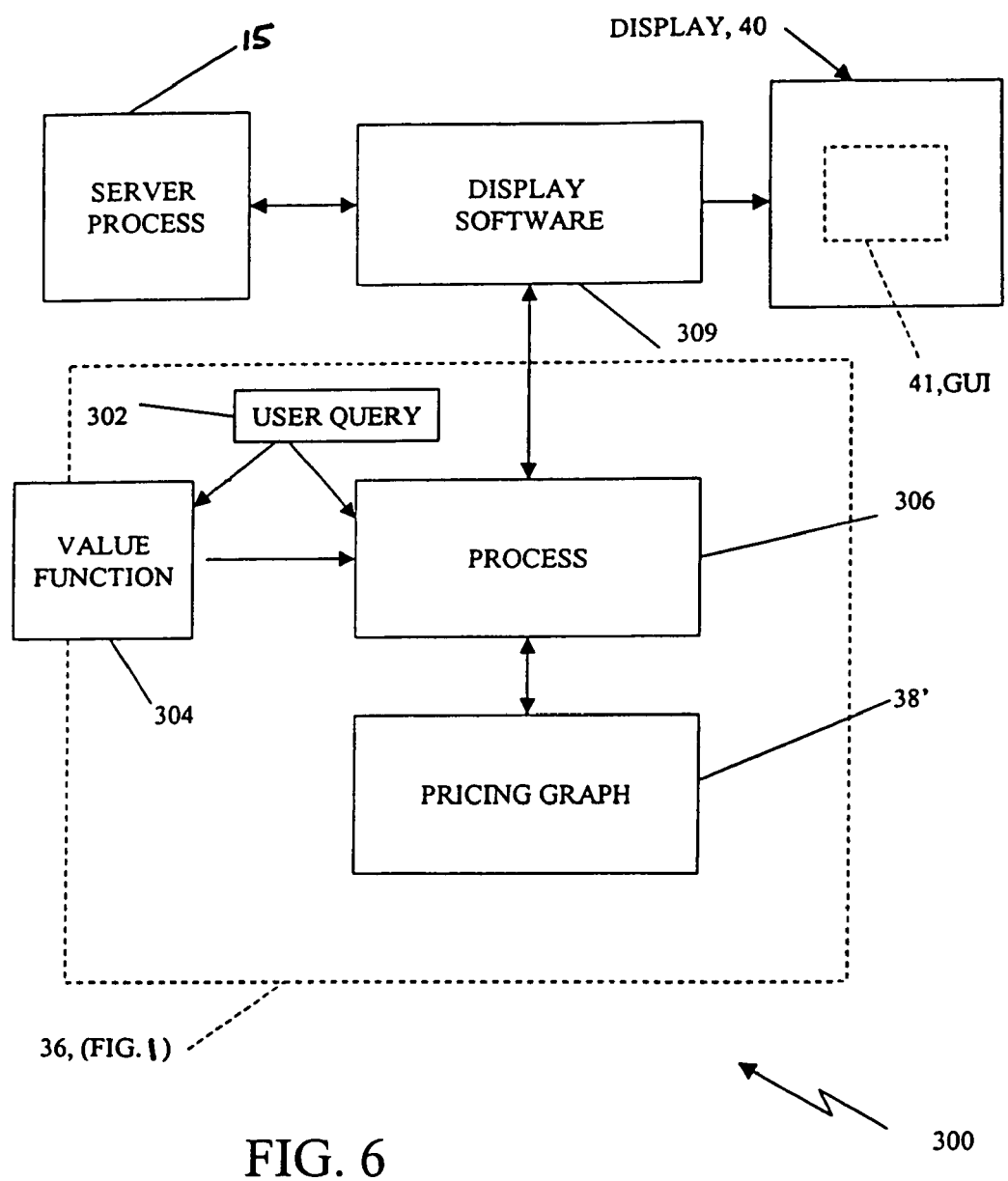
FIG. 6 is a block diagram showing the relationship between the pricing graph and a graphical user interface for the travel planning system of FIG. 1.

Referring now to FIG. 6, a high level illustration of a process 300 that operates on the pricing graph 38' typically as a client process 36 on the client computer system is shown. The process 300 includes a user query 302 that passes parameters into a process 306 and a value function 304 to extract from the pricing graph 38' certain pricing solutions that satisfy parameters specified by the user query 302. The extracted pricing solutions are returned as a list or other representation. Generally the pricing solutions are displayed on the display 40. Display software handles production of GUI's 41 to present the information.

Figure 7:
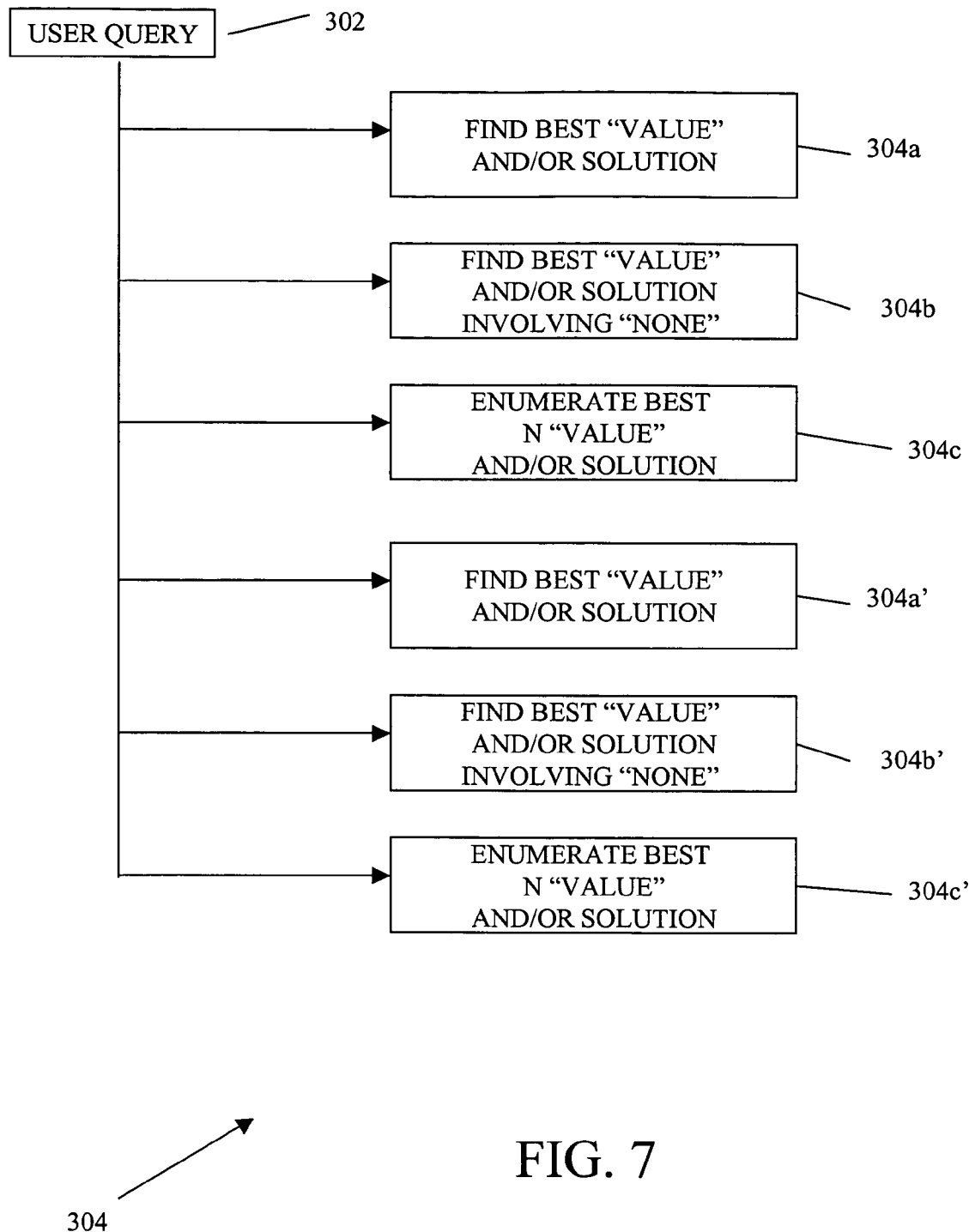
FIG. 7 is a flow chart showing various enumeration functions.

The pricing solution list will contain pricing solutions extracted from the pricing graph 38' in accordance with user specified parameters from the user query 302 using one of the processes 304 of FIG. 7, where some exemplary illustrative processes are shown. In particular, in response to the user query 302, one of the processes is executed. The processes 304 can comprise a find best "value" and pricing solutions associated with the value (e.g., price) process 304*a*; find best "value" and pricing solutions associated with the value for "node" (e.g., find best price for a particular itinerary) process 304*b*; an enumeration for "N" pricing solutions 304*c*; or an enumeration process that lists the pricing solutions according to some "value." Additional enumeration processes can be provided to produce query results corresponding to different ways of looking at pricing solutions extracted from the pricing graph 38'. A node invalidating process (not shown) that invalidates selected nodes from contributing to a pricing solution is also included.

Examples of each of these processes are set forth below.

Efficient algorithms 304 are used for manipulating this representation to extract information of interest and to enumerate set of pricing solutions from the structure. For example, it is possible to quickly extract the cheapest solution; to find the cheapest solution involving selected fares and itineraries; to verify whether any pricing solution remains if specific fares or itineraries are excluded; to enumerate solutions under various orderings and so forth. Furthermore, the representation is compact enough so that it can be efficiently stored and transmitted such as from the server to the client. One benefit, therefore, is that after a single fare search in the server process 15, the server process 15 transfers the pricing graph 38 to the client process 36. The client process 36 can examine and manipulate the large space of pricing solutions represented in the pricing graph 38' without further interaction with the server process 18.

For the set of pricing solutions represented by the pricing graph 38' to be useful, processes are provided to extract pricing solutions from the graph and manipulate the set of pricing solutions, as depicted in FIG. 7. In general, each of the enumeration processes to be described operate on the pricing graph to extract pricing solutions from the pricing graph according to particular criteria that can be set, for example, by a client system 30*c* (FIG. 2) in response to a user query 48 (FIG. 2). Examples of user queries as well as a display representation for information extracted from the pricing graph will be described below.

An example of an enumeration function enumerates pricing solutions in a specific order. For example, an enumeration function can enumerate the 100 cheapest pricing solutions represented by the pricing graph 38'. A second enumeration function can find extreme points of the set of pricing solutions. This can be used, for example, to find the most convenient pricing solution. In addition, a value function can specify a minimum value of some value over the set of pricing solutions that involve a particular node. One value function finds for each itinerary the cheapest pricing solution that involves that itinerary or the shortest total duration of any pricing solution that involves that itinerary.

In addition, each of the above operations can be performed on a subset of the graph. For example, it may be desirable to enumerate the 100 cheapest solutions that involve a given itinerary or finding the most convenient solution that involves only refundable fares or includes only certain airlines or excludes certain airlines.

Value Functions

There are many processes or operations on the pricing graph 38' that use a value-function, a function that operates on the terminal nodes of the pricing graph 38' and returns a numerical value that can be used to rank pricing-solutions. Examples of 25 value-functions include price computed by summing the prices of fares (and penalties and surcharges) in a pricing-solution, duration, or convenience (that might be a mix of total travel-time with penalties for stops and airline-changes, for example), or mixes of each.

Many of the processes used to manipulate the pricing graph 38' depend on a value-function being decomposable into the sum of a second function that is applied to individual terminal nodes in the pricing-graph. The "price value function" meets this requirement, because the total price of a pricing-solution is equal to the sum of the prices of fares. Many expressions of convenience also meet this requirement, including those that can be computed as the sum of a function applied to individual itineraries. However, there are some value-functions that cannot be placed into this form. An example is a "convenience" function that checks whether travel in different slices is on the same airline. Such a function depends on all itineraries at once.

In general, in the discussion below, the term node-value-function is used to refer to a function that is applied to individual nodes in the pricing-graph, and summed to produce the value of an entire itinerary. The term value-function is used for the more general case of a function that may or may not be decomposable into the sum of a node-value-function applied to each terminal in the pricing-graph.

Finding the Best Pricing Solution

The first process 304a is an example of one that finds extreme points of the set of pricing-solutions, such as the cheapest pricing-solution.

Assuming that it is desired to find a pricing-solution that minimizes some value-function that can be decomposed into a node-value-function F, the best pricing solution could be found by enumerating all pricing-solutions and applying F to each of them. This is impractical because of the large number of set of pricing solutions.

The Best Price algorithm 304a efficiently finds the cheapest (best) price by starting at the "bottom" of the pricing-graph 38' and constructing the best solution for each node by looking at the best solution of its children. In this way it works in one pass from the bottom of the graph to the top. At the end of the process the root node contains the best pricing solution for the entire pricing graph 38.

The algorithm proceeds as follows: first, the nodes in the graph are ordered by depth and placed in a list, so that iterating over the list ensures that a child node is always encountered before its parent(s). Then, iterating across the list, the best value of F is computed for each node, using the already-computed values of F for its children. At this point every node in the graph is marked with its inner-value. The inner-value of a node is the best possible value of the function F on the set of (partial) pricing-solutions represented by the node. As inner-values are computed, for every OR node the child with the lowest inner-value is computed and stored. Finally, the best pricing solution can be constructed by starting at the root of the graph and collecting children. Whenever an OR node is encountered, the best child is chosen (the child with the lowest inner-value).

If a node is a terminal fare or itinerary, then its inner-value is the value of F applied to the node. If the node is an AND, representing a combination, then the minimum value of F over the partial solutions it represents is the sum of the minimum values of F over the partial solutions represented by each of its children. If a node is an OR, representing a choice, then the minimum value of F over the partial solutions it represents is found by making the optimal choice of children, that is, the child with the minimum inner-value. So the inner-value of an OR is the minimum of the inner-values of its children.

The pseudo-code in TABLE 15 summarizes the computation of inner-values. The function sort-nodes takes a root node and returns a list of all nodes under it, sorted by depth with the root node at the end. The procedure compute-inner-values takes in a sorted list of nodes as would be produced by sort-nodes, and a node-value-function. The procedure find-optimal-solution takes in a root-node and a node-value-function, calls sort-nodes and compute-inner-values to calculate inner-values for all nodes in the pricing-graph, and constructs a pricing-solution.

TABLE 15

```
sort-nodes(node)
Let nodes =

For child in node.children
        nodes = append(nodes, sort-nodes(child))
        nodes += node
return(nodes)
        compute-inner-values(sorted-nodes, node-value-
           function)
For node in sorted-nodes
    If (node.type = terminal)
        node.inner-value = apply(node-value-function,
           node.terminal-object)
    Else If (node.type = OR)
        node.inner-value = infinity
        For child in node.children
            If (child.inner-value <node.inner-value)
                node.inner-value = child.inner-value
                node.best-child = child
    Else If (node.type = AND)
        node.inner-value = 0
        For child in node.children
            node.inner-value += child.inner-value
find-optimal-solution(root-node, node-value-function)
    Subroutine get-node-solution(node)
        If (node.type = terminal)
            return(list(node.terminal-object))
        Else If (node.type = OR)
            return(get-node-solution(node.best-child))
```

TABLE 15-continued

```
Else If (node.type = AND)
    Let solution =
        For child in node.children
            solution = append(solution, get-node-solution(child))
        return(solution)
compute-inner-values(sort-nodes(root-node), node-value-function)
return(get-node-solution(root-node))
```

Finding Minimum Value

Another procedure 304b finds, for each node, the best (i.e., minimum) value of some value-function over all the set of pricing solutions involving that node. Price function 304b finds for each itinerary, the cheapest price of any pricing solution that contains that itinerary. These values can be computed efficiently, if the value-function can be decomposed into a node-value-function.

The best price value function 304b computes inner-values, as above, and computes for every node, an outer-value, equal to the minimum value contributed by all parts of the graph except that represented by the node. For each node, the minimum value of the value-function over all solutions that involve the node, (i.e., the total-value) is computed as the sum of that node's inner-value and outer-value.

The outer-value and total-value of a node are computed in a manner very similar to the computation of the inner-value. In particular, the outer-value for each node is calculated starting from the root of the graph, that has an outer-value of 0. Each node propagates outer-values down to its children. An OR-node passes its outer-value unchanged. An AND-node adds to its outer-value the inner-values of all children except that being propagated to. At every node, after the outer-value has been computed, the total-value is computed as the sum of the inner-value and outer-value.

When outer-values are propagated from a node to its children, a minimum computation is performed. This is because each child may have more than one parent, and its outer-value must be the minimum outer-value contributed by any parent. See TABLE 16 below.

TABLE 16

```
compute-outer-and-total-values(root-node, node-value-function)
    // Sort nodes and computer inner-values.
    Let sorted-nodes = sort-nodes(root-node)
    compute-inner-values(sorted-nodes, node-value-function)
    Let reversed-nodes = reverse(sorted-nodes)
    // Initialize all nodes to have outer-values of infinity.
    For node in reversed-nodes
        node.outer-value = infinity
    // The root-node has an outer-value of 0.
    first(reversed-nodes).outer-value = 0
    For node in reversed-nodes
        // Compute the total-value for the node.
        node.total-value = node.inner-value + node.outer-value
        If (node.type = OR)
            // For OR nodes, the outer-value is propagated down to its children unchanged.
            For child in node.children
                child.outer-value = minimum(child.outer-value, node.outer-value)
        Else If (node.type = AND)
            // For AND nodes, the outer-value is propagated down by adding the inner-values of
            // all but the child being propagated to. This is equal to the node=s inner-value minus
            // the child=s inner-value, which is equal to the node=s total-value minus the child=s
            // inner-value.
            For child in node.children
                child.outer-value = minimum(child.outer-value, node.total-value B child.inner-value)
```

Invalidating Nodes

It may be desirable to "invalidate" certain nodes from the pricing-graph 38'. For example, itineraries containing or not containing specified airlines could be marked as not participating in the above algorithms, enabling the algorithms to find the best solutions involving or not involving these itineraries. The above algorithms can be easily adapted to accommodate checking whether the node is valid. In particular, the computation of inner-values, the first step in all the above algorithms, is modified to mark for every node whether the node represents any valid partial pricing-solutions given a specific query parameter. This information can be used in the rest of the algorithms. Every terminal node contains a field "valid?" that is either true or false. The compute-inner-values procedure uses these values to set the "valid?" field for non-terminals. See TABLE 17 below:

TABLE 17

```
// Initialize all nodes to have outer-values of infinity.
For node in reversed-nodes
     node.outer-value = infinity
// The root-node has an outer-value of 0.
first(reversed-nodes).outer-value = 0
For node in reversed-nodes
     If (nodevalid? = true)
          // Compute the total-value for the node.
          node.total-value = node.inner-value + node.outer-value
          If (node.type = OR)
               // For OR nodes, the outer-value is propagated down to its children unchanged.
               For child in node.children
                    child.outer-value = minimum(child.outer-value, node.outer-value)
          Else If (nodetype = AND)
               // For AND nodes, the outer-value is propagated down by adding the inner-values of
               // all but the child being propagated to. This is equal to the node=s inner-value minus
               // the child=s inner-value, which is equal to the node=s total-value minus the child=s
               // inner-value.
               For child in node.children
                    child.outer-value = minimum(child.outer-value,
                                        node.total-value B child.inner-value)
sort-nodes (node)
If (not(find(node,nodes)))
For child in node.children
sort-nodes-inner(child)
nodes +=node
sort-nodes-inner(node);
return (nodes)
compute-inner-values(sorted-nodes, node-value-function)
     For node in sorted-nodes
          If (node.type = terminal)
               node.inner-value = apply(node-value-function, node.terminal-object)
          Else If (node.type = OR)
               node.inner-value = infinity
               node.valid? = false
               For child in node.children
                    If (child.valid? = true and child.inner-value < node.inner-value)
                         node.inner-value = child.inner-value
                         node.best-child = child
                         node.valid? = true
          Else If (node.type = AND)
               node.inner-value = 0
               node.valid? = true
               For child in node.children
                    If (child.valid? = true)
                         node.inner-value += child.inner-value
                    Else
                         node.valid? = false
find-optimal-solution(root-node, node-value-function)
     Subroutine get-node-solution(node)
          If (node.type = terminal)
               return(list(node.terminal-object))
          Else If (node.type = OR)
               return(get-node-solution(node.best-child)
          Else If (node.type = AND)
               Let solution =

For child in node.children
                    solution = append(solution, get-node-solution(child))
               return(solution)
     compute-inner-values(sort-nodes(root-node), node-value-function)
     If (root-node.valid? = true)
          return(get-node-solution(root-node))
     Else
          return(nil)
```

TABLE 17-continued

```
compute-outer-and-total-values(root-node, node-value-function)
    // Sort nodes and computer inner-values.
    Let sorted-nodes = sort-nodes(root-node)
    compute-inner-values(sorted-nodes, node-value-function)
    Let reversed-nodes = reverse(sorted-nodes)
// Initialize all nodes to have outer-values of infinity.
For node in reversed-nodes
    node.outer-value = infinity
// The root-node has an outer-value of 0.
first(reversed-nodes).outer-value = 0
For node in reversed-nodes
    If (node.valid? = true)
        // Compute the total-value for the node.
        node.total-value = node.inner-value + node.outer-value
        If (node.type = OR)
            // For OR nodes, the outer-value is propagated down to its children unchanged.
            For child in node.children
                child.outer-value = minimum(child.outer-value, node.outer-value)
        Else If (node.type AND)
            // For AND nodes, the outer-value is propagated down by adding the inner-values of
            // all but the child being propagated to. This is equal to the node=s inner-value minus
            // the child=s inner-value, which is equal to the node=s total-value minus the child=s
            // inner-value.
            For child in node.children
                child.outer-value =minimum(child.outer-value,
                                    node.total-value B child.inner-value)
```

Enumerating Pricing Solutions

It is often desirable to arbitrarily enumerate many pricing solutions: the best, the second-best, the third-best, etc.

The enumeration algorithm 304c maintains a queue of partial-solutions, ordered by the lowest possible total value of the value-function over all complete solutions that contain the partial-solution. At the start of the search, a single partial solution is constructed from the root node of the pricing-graph 38'. At each step the best partial-solution is dequeued, and expanded. Each partial-solution has a set of non-terminal nodes and a set of terminal objects. A partial-solution is expanded by selecting a non-terminal node and substituting the node's children (all of its children in the case of an AND, one of its children in the case of an OR). If a dequeued partial-solution contains only terminal objects, it is complete, and is returned. This process continues until the desired number of pricing-solutions that can be specified by a user has been produced.

The algorithm can accommodate value-functions that cannot be decomposed into the sum of a node-value-function. It does this by applying a second penalty-value-function to partial pricing-solutions as it constructs them. This function returns a non-negative number when given a new terminal object and existing set of terminal objects. The number is added to the values produced by the normal node-value-function. If the number is positive, it acts as a penalty. An example of how this could be used is for the case where a penalty is applied if travel in two slices is on different airlines. The penalty-value-function would return a (positive) penalty if the terminal was an itinerary, and the set of existing terminals contained an itinerary with travel on different airlines. Otherwise it would return 0. See TABLE 18 below.

TABLE 18

```
compute-inner-values(sorted-nodes, node-value-function)
    For node in sorted-nodes
        If (node.type = terminal)
            node.inner-value = apply(node-value-function, node.terminal-object)
        Else If (node.type = OR)
            node.inner-value = infinity
            node.valid? = false
            For child in node.children
                If (child.valid? = true and child.inner-value <node.inner-value)
                    node.inner-value = child.inner-value
                    node.best-child = child
                    node.valid? = true
        Else If (node.type = AND)
            node.inner-value = 0
            node.valid? = true
```

TABLE 18-continued

```
                For child in node.children
                        If (child.valid? = true)
                                node.inner-value += child.inner-value
                        Else
                                node.valid? = false
        find-optimal-solution(root-node, node-value-function)
                Subroutine get-node-solution(node)
                        If (node.type = terminal)
                                return(list(node.terminal-object))
                        Else If (node.type = OR)
                                return(get-node-solution(node.best-daughter))
                        Else If (node.type = AND)
                                Let solution = 0
                                For child in node.children
                                        solution = append(solution, get-node-solution(child))
                                return(solution)
                compute-inner-values(sort-nodes(root-node), node-value-function)
                If (root-node.valid? = true)
                        return(get-node-solution(root-node))
                Else
                        return(nil)
        compute-outer-and-total-values(root-node, node-value-function)
                // Sort nodes and computer inner-values.
                Let sorted-nodes = sort-nodes(root-node)
                compute-inner-values(sorted-nodes, node-value-function)
                Let reversed-nodes = reverse(sorted-nodes)
                // Initialize all nodes to have outer-values of infinity.
                For node in reversed-nodes
                        node.outer-value = infinity
                // The root-node has an outer-value of 0.
                first(reversed-nodes).outer-value = 0
                For node in reversed-nodes
                        If (node.valid? true)
        // Compute the total-value for the node.
        node.total-value = node.inner-value + node.outer-value
        If (node.type = OR)
                // For OR nodes, the outer-value is propagated down to its children unchanged.
                For child in node.children
                        child.outer-value = minimum(child.outer-value, node.outer-value)
        Else If (node.type = AND)
                // For AND nodes, the outer-value is propagated down by adding the inner-values of
                // all but the child being propagated to. This is equal to the node=s inner-value minus
                // the child=s inner-value, which is equal to the node=s total-value minus the child=s
                // inner-value.
                For child in node.children
                        child.outer-value = minimum(child.outer-value,
                                        node.total-value B child.inner-value)
```

Figure 8:
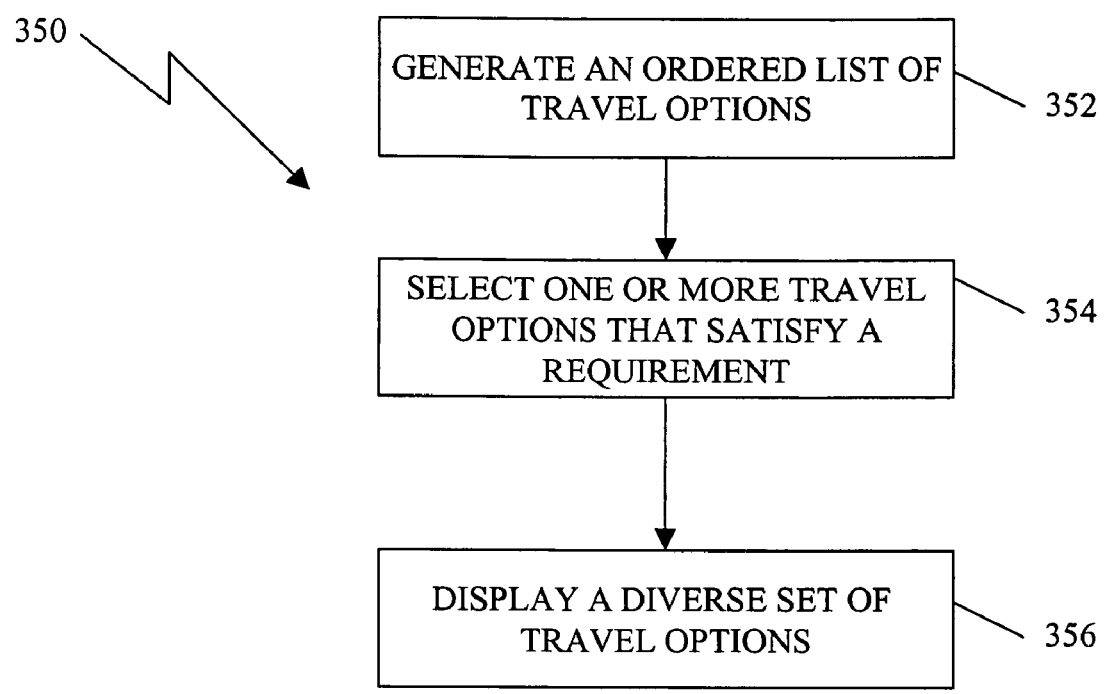
FIG. 8 is flow chart of a diversity process for selecting a diverse set of travel options.

Referring to FIG. 8, a diversity process 350 for selecting a diverse set of travel options from a larger set of candidate travel options is shown. The diversity process includes generating 352 an ordered list of travel requirements that represent conditions possibly required for a travel option to be the best travel option to generate. The diversity process 350 selects 354 for each travel requirement the one or more travel options that satisfy the requirement preferably by choosing those travel options that best satisfy one or more travel preference functions that can be used to order travel options.

For example, the air travel planning system generates the following 10 travel requirements for a set of travel options that each include one or more flights.
1. <none>
2. all flights on American Airlines.
3. all flights on United Airlines.
4. non-stop.
5. departing in morning.
6. departing in evening.
7. non-stop on American Airlines.
8. non-stop on United Airlines.
9. non-stop in morning.
10. non-stop in evening.

The diversity process 350 for each of the requirements the planning system selects 354 from the large set of candidate travel options e.g., the cheapest travel option that satisfies the requirement. The cheapest option is generated; the cheapest options all on American Airlines; the cheapest travel options all on United Airlines; the cheapest travel options that are non-stop; and so forth. These travel options are displayed 356 to provide a traveller a desirable option even if the traveller has restrictions on the times the traveller can travel, or preferences for one airline over another. These options are possible more desirable than if the system had merely generated and sent the 10 cheapest solutions without regard to producing a diverse set of solutions taking into consideration preferences of the traveller.

Figure 9:
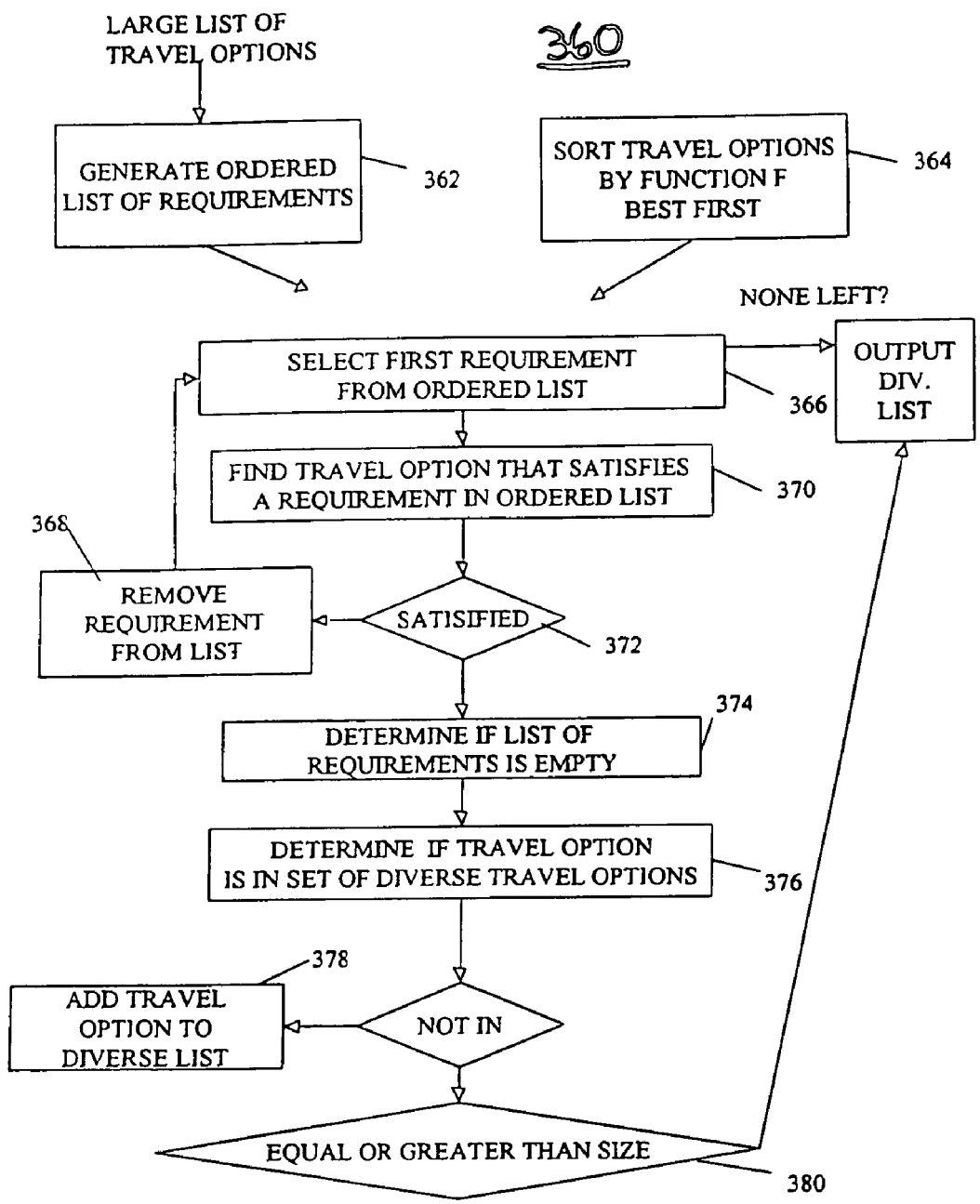
FIG. 9 is a flow chart depicting an example of a diversity process.

Referring to FIG. 9, an example 360 of a diversity process 350 is shown. The diversity process 360 generates a diverse list of travel options from a larger set of travel options. The diversity process iterates through a set of travel requirements and selects the best travel option for each requirement. The diversity process 360 can include an optional process that may improve efficiency in some cases by eliminating more-restrictive travel requirements that are satisfied by solutions selected for less-restrictive travel requirements.

For example, given the ordered travel requirements in the list above, if the cheapest travel option selected for the travel requirement "all flights on American Airlines" happens to be a non-stop option, then the travel requirement "non-stop on American Airlines" is removed from the list of travel requirements to be satisfied, since the same travel option selected for the first requirement will be the best for the second more-specific requirement. This is only applied if the all restrictions in the first requirement are also found in the second requirement.

The diversity process 360 thus includes a procedure for generating a diverse list of (N) travel options (Rts) from a larger list of travel options (Ts), that are the best travel options for a set of travel requirements (R), as defined by an ordering function F. The diversity process 360 generates 362 an prioritized (ordered) list of requirements Rs, and sorts 364 the list of travel options (Ts) by function (F) to produce a best-first ordered list (Ts2). The diversity process 360, initializes the list of result travel options (RTs) to be empty. If the remaining list of requirements (Rs) is empty, the process 360 returns an ordered list of diverse travel options (Rts). Otherwise, the diversity process selects 366 the first travel requirement (R) from the ordered list of requirements (Rs) and removes 368 a requirement (R) from the requirement list (Rs). The diversity process 360 finds 370 a first (e.g., best) option T in the best-first ordered list (Ts2) that satisfies travel requirement (R).

In some embodiments the set of travel options is represented by a data structure that stores a large set of travel options by representing permitted combinations of smaller travel option components such as airline flights and fares. In such cases the travel option selection process above is implemented using a more complicated operation than searching through an ordered list. With the pricing-graph the process for finding 370 the best travel option that satisfies a travel requirement is implemented for a representation that expresses travel options in terms of permitted combinations of smaller travel option components by disabling option components inconsistent with the requirement.

Figure 9A:
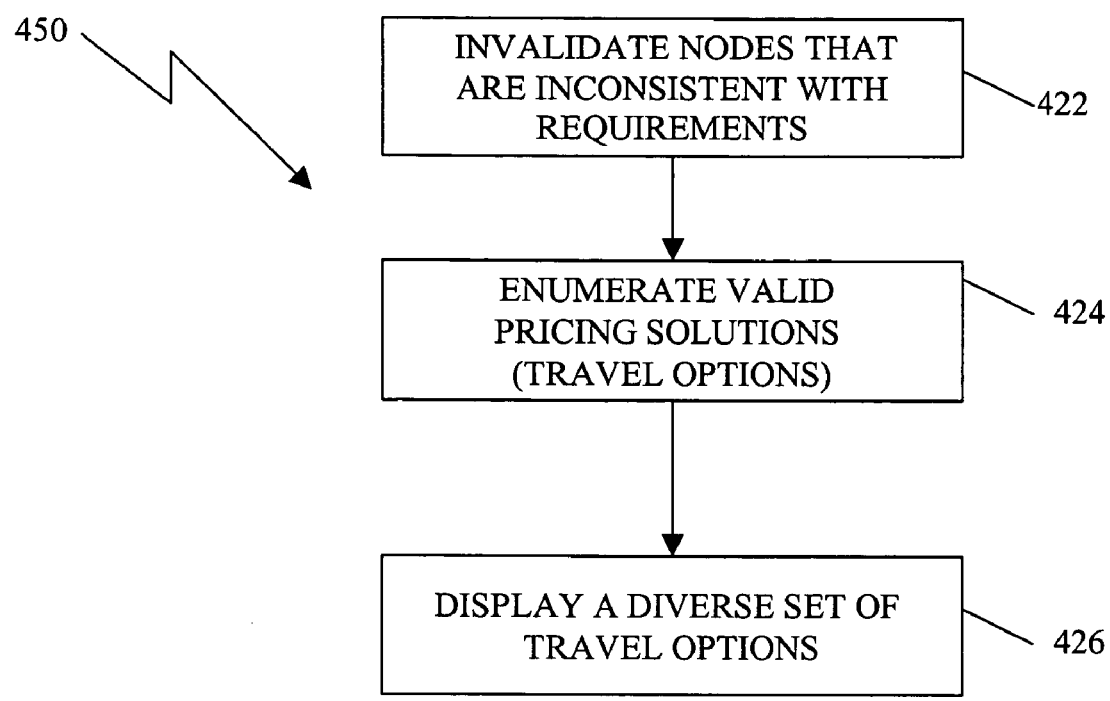
FIG. 9A is a flow chart depicting a process used with a pricing graph.

As shown in FIG. 9A, the process 360 can use the node invalidating functions to invalidate nodes 422 in the pricing graph 38 that are inconsistent with the requirements. The process 360 applies 424 an enumeration algorithm that extracts the best solution from the pricing graph representation. The diversity process 360 calls an enumeration function, as described above, to enumerate all of the valid pricing solutions from the pricing graph that are remaining after the diversity process selectively invalidated nodes in the graph inconsistent with the travel requirements.

If no option in the best-first ordered list (Ts2) satisfies 372 the requirement (R), the process 360 goes to check 374 if the remaining list of requirements (Rs) is empty. Otherwise, the diversity process determines 376 if a travel option T is not already in result travel options list (RTs). If the option T is not in the list (RTs), the diversity process adds 378 the travel option T to end of the result travel option list (RTs). If the size of the travel option list (RTs) is equal to or greater than N 380 the process returns the ordered list of diverse travel options.

Figure 10:
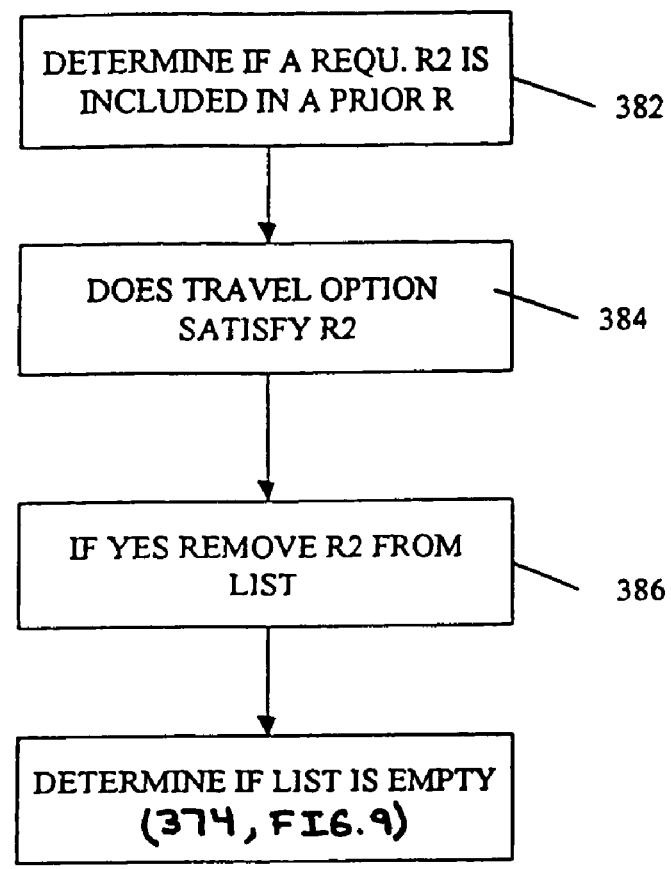
FIG. 10 is a flow chart of a process to generate a prioritized list of travel requirements for the diversity process of FIG. 3.

Referring to FIG. 10, the diversity process 360 could optionally determine 382 for a travel requirement (R2) in the set of travel requirements (Rs), whether the requirement (R2) is included in a prior requirement (R), and whether the travel option T also satisfies 384 the requirement (R2). If the travel option T satisfies the requirement (R2), the process 360 can remove 386 the requirement R2 from the requirement list (Rs) and return to determine 374 (FIG. 9) if the remaining list of requirements is empty.

Figure 11:
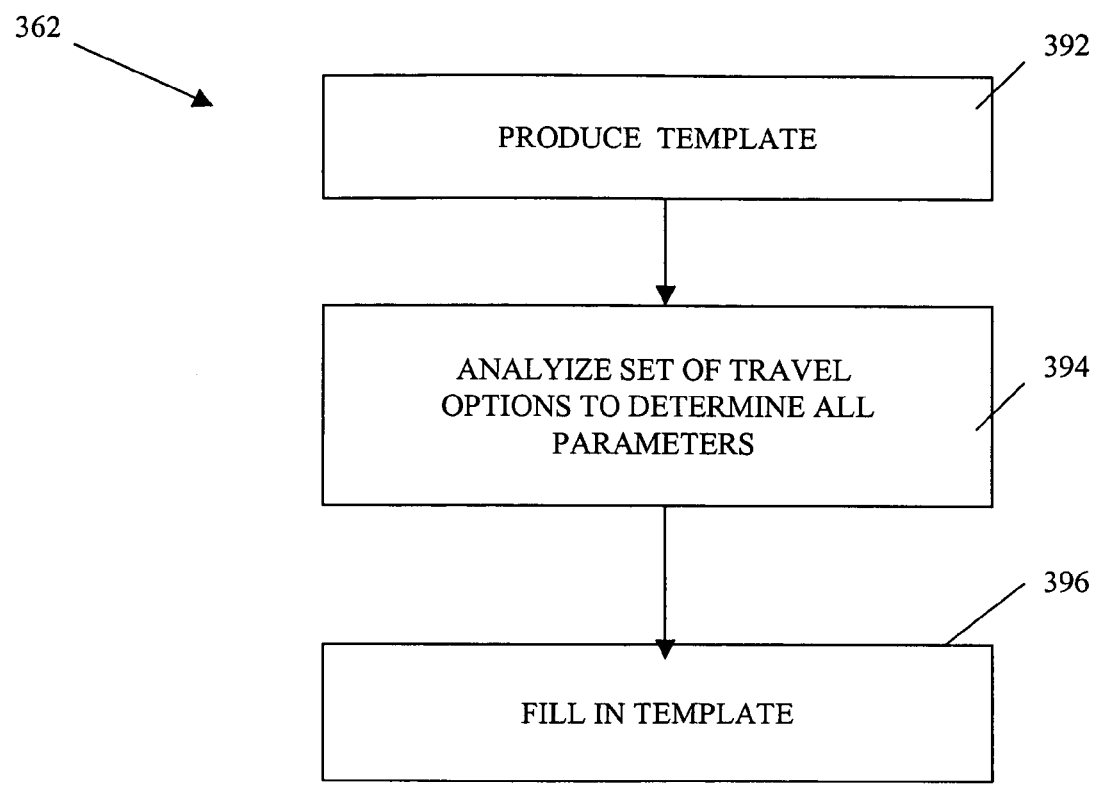
FIG. 11 is a flow chart of template process used in the diverstiy process.

Referring to FIG. 11, the process 362 to generate a prioritized list of travel requirements is shown. The list may be a fixed list, for example the list of ten requirements in the example above. Alternatively, the list may be generated taking into account the number of solutions required, the ordering function, and the large set of candidate travel options. For example, the list may be generated 362 by filling 392 in a set of template requirements. A sample set of templates for air travel is 1. no requirement.
2. all flights on <airline>
3. non-stop.
4. outbound departure in <morning or afternoon or evening>.
5. return departure in <morning or afternoon or evening>.
6. outbound departure date <date>.
7. return departure date <date>.
8. non-stop on <airline>.
9. outbound departure date <date1> and return departure date <date2>.

The large candidate set of travel options may be analyzed 394 to find all parameters e.g., airlines found in any travel option, all departure dates for outbound and return, and all departure parts-of-day (morning, afternoon, evening) for outbound and return. The ordered list of requirements is generated by filling 396 in for each template all airlines, dates and parts-of-day present in the options.

The diversity process 360 can be run more than once with different travel option preference functions (a set of F's). For example, a travel planning system may output a diversity of travel options that include diverse options that are cheap and diverse options that are convenient, reflecting uncertainty in whether a traveller is cost-sensitive or convenience-sensitive.

Figure 12:
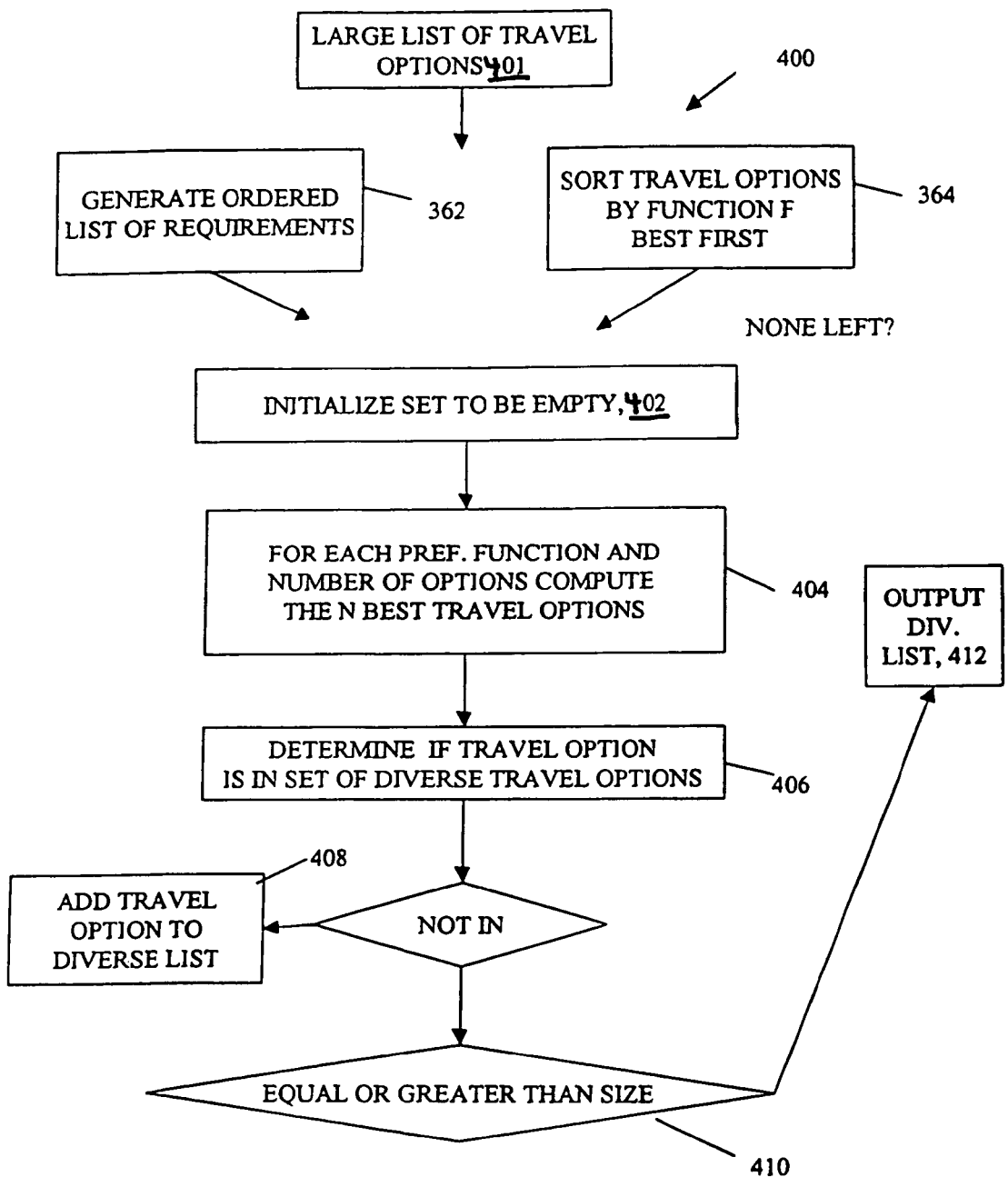
FIG. 12 is a flow chart of an alternative diverstiy process to generate a diverse set of travel options from a larger set of travel options.

Referring to FIG. 12, an alternative diversity process 400 to generate a diverse set of travel options from a larger set of travel options is shown. The alternative diversity process 400 generates the best one or more travel options as defined by each of a set of different travel preference functions. The alternative diversity process 400 defines a set of travel preference functions with each function capable to order travel options. In one example, the set might include "cheapest", "quickest", and "most-convenient" where each is a function that assigns a numerical score to a complete travel option (such as price, total-trip-time, and total trip-time with penalties for stops). Functions that assign numerical values based on combinations of cost and convenience are possible, such as functions that weigh both price and time.

Given set of travel options Ts 401, a set of preference functions Fs, and a desired number of answers for each preference function Ns, the alternative diversity process 400 returns a reduced set of diverse travel options Rts. The alternative diversity process initializes 402 a list of result travel options RTs to be empty and for each preference function F in the set of preference functions Fs and number of travel options (N) in the set of desired number of answers in each preference function (Ns), the alternative diversity process 400 computes 404 the N best travel options in Ts as defined by F. For each travel option T, unless the travel option T is in the set of diverse travel options Rts 406, the alternative diversity process 400 adds 408 the travel option T to the set of diverse travel options Rts and checks 410 the number of options. The alternative diversity Process 400 outputs 412 the diverse set of travel options (RTs).

The diversity process can be run more than once with different travel option preference functions (a set of F's). For example, a travel planning system may wish to output a diversity of travel options that include diverse options that are cheap and diverse options that are convenient, reflecting uncertainty in whether a traveler is cost-sensitive or convenience-sensitive.

A computer travel planning system that outputs a diversity of travel options may be built by combining a travel planning system that transmits a larger set of solutions to a second computer system that reduces the set of travel options using diversity procedures as described above.

OTHER EMBODIMENTS

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A travel planning system comprising:
   a requirements generator module to generate a set of diverse travel requirements, by establishing a plurality of travel requirements templates, and for each travel requirement template, defining a plurality of travel requirements corresponding to different values of the travel requirements with values for a particular travel requirements template based on a candidate set of travel options; and
   a selection module to output a set of diverse travel options, the number of travel options in the set of diverse travel options being fewer in number than the number of travel options in the candidate set of travel options and for each diverse travel requirements in the set of diverse travel requirements, selecting from the candidate set of travel options one or more travel options that satisfy that travel requirements with the candidate set of travel options represented using a data structure that compactly stores the candidate set of travel options.

2. The travel planning system of claim 1 wherein the data structure comprises a graph data structure.

3. The travel planning system of claim 1 further comprising a display to display the diverse set of travel options.

4. The travel planning system of claim 1 further comprising:
   a travel option generator module to generate a first ordered set of travel options using a first preference function and a second ordered set of travel options using a second preference function, and
   wherein the selection module outputs a set of diverse travel options by selecting a first and second number of travel options from each of the first and second ordered set of travel options, respectively.

5. The travel planning system of claim 1 wherein at least one of the diverse travel requirements within the plurality is not a user entered travel requirement.

6. The travel planning system of claim 1 wherein the plurality of diverse travel requirements comprise at least one of travel on a particular carrier, non-stop travel, outbound travel departing in a predefined time period, return travel departing in a predefined time period, non-stop travel on a predefined airline, or travel with an outbound departure on a first predefined date and a return arrival on a second predefined date.

7. The travel planning system of claim 6 wherein the predefined time period comprises morning, afternoon, evening or a predefined date.

8. The travel planning system of claim 1 wherein the compact data structure comprises a directed acyclic graph.

9. The travel planning system of claim 1 wherein the compact data structure comprises a grammar.

10. A method for generating a diverse set of travel options, the method comprising:
    determining a candidate set of travel options, the candidate set of travel options being based on user input and represented a data structure that compactly stores the candidate set or travel options;
    defining a set of diversity requirements, with defining comprising:
    establishing a plurality of travel requirement templates, and for each travel requirement template, defining a plurality of travel requirements, each of the plurality of travel requirements corresponding to a different value of the respective travel requirements with values for a particular travel requirement template based on the candidate set of travel options, and
    for each travel requirement in the set of diversity requirements, selecting from the candidate set of travel options a travel option that satisfies that travel requirement;
    combining the selected travel options for the travel requirements to generate the diverse set of travel options; and
    displaying the diverse set of travel options to a user.

11. The method of claim 10 wherein the plurality of travel requirement templates include particular carriers, number of stops, outbound travel departing in a predefined time period, return travel departing in a predefined time period, or travel with an outbound departure on a first predefined date and a return arrival on a second predefined date.

12. The method of claim 11 wherein values for the travel requirement template of particular carriers include a first particular airline and a second, different particular airline.

13. The method of claim 10, wherein the structure that compactly stores comprises a graph data structure.

14. The method of claim 10 wherein the structure that compactly stores comprises a directed acyclic graph.

15. The method of claim 10 wherein the structure that compactly stores comprises a grammar.

16. The method of claim 10 wherein selecting comprises:
    generating a first ordered set of travel options using a first preference function and a second ordered set of travel options using a second preference function to operate on the structure that compactly stores the travel options, and combining the selected travel options further comprises
    combining a first and second number of travel options from each of the first and second ordered set of travel options, respectively to generate the diverse travel options.

17. The method of claim 10 wherein the least one of the diverse travel requirements within the plurality is not a user entered travel requirement.

18. The method of claim 10 wherein the plurality of diverse travel requirements comprise at least one of travel on a particular carrier, non-stop travel, outbound travel departing in a predefined time period, return travel departing in a predefined time-period, non-stop travel on a predefined airline, or travel with an outbound departure on a first predefined date and a return arrival on a second predefined date.

19. An article of manufacture having computer-readable program portions embodied therein for generating a diverse set of travel options, the article comprising instructions for causing a processor to:

determine a candidate set of travel options, the candidate set of travel options being based on user input and represented using a data structure that compactly stores the candidate set of travel options;

define a set of diversity requirements with instructions to define comprising instructions to:

establish a plurality of travel requirement templates, and for each travel requirement template, define a plurality of travel requirements, each of the plurality of travel requirements corresponding to a different value of the respective travel requirements with values for a particular travel requirement template based on the candidate set of travel options, and for each travel requirement in the set of diversity requirements, select from the candidate set of travel options a travel option that satisfies that travel requirements;

combine the selected travel options for the travel requirements to generate the diverse set of travel options; and display the diverse set of travel options to a user.

20. The article of claim 19 wherein the plurality of travel requirement templates include templates for particular carriers, number of stops, outbound travel departing in a predefined time period, return travel departing in a predefined time period, or travel with an outbound departure on a first predefined date and a return arrival on a second predefined date.

21. The article of claim 20 wherein values for the travel requirement template of particular carriers with corresponding travel requirements include a first particular airline and a second, different particular airline.

22. The article of claim 20 wherein the predefined time periods comprise morning, afternoon, evening or a predefined date.

23. The article of claim 19 wherein the structure that compactly stores comprises a graph data structure.

24. The article of claim 19 wherein the structure that compactly stores comprises a directed acyclic graph.

25. The article of claim 19 wherein the structure that compactly stores comprises a grammar.

26. The article of claim 19 wherein instructions to select further comprise instructions to:

generate a first ordered of travel using a first preference function and a second ordered set of travel options using a second preference function to operate on the structure that compactly stores the travel options, and combining the selected travel options further comprises combine a first and second number of travel options from each of the first and second ordered set of travel options, respectively to generate the diverse travel options.

27. The article of claim 19 wherein at least one of the diverse travel requirements within the plurality is not a user entered travel requirement.

28. The article of claim 19 wherein the plurality of diverse travel requirements comprise at least one of travel on a particular carrier, non-stop travel, outbound travel departing in a predefined time period, return travel departing in a predefined time period, non-stop travel on a predefined airline, or travel with an outbound departure on a first predefined date and a return arrival on a second predefined date.

29. The article of claim 19 wherein the predefined time period comprises morning, afternoon, evening or a predefined date.

* * * * *